US 9,014,993 B2
Apr. 21, 2015

(12) United States Patent
Yokohata et al.

(54) FLOW RATE MEASURING DEVICE

(75) Inventors: Mitsuo Yokohata, Osaka (JP); Ryuji Iwamoto, Nara (JP); Takuhisa Ootani, Nara (JP); Kouichi Ueki, Nara (JP); Kazutaka Asano, Nara (JP); Hajime Miyata, Shiga (JP); Youichi Itou, Nara (JP)

(73) Assignee: Panasonic Corporation, Osaka (JP)

( * ) Notice: Subject to any disclaimer, the term of this patent is extended or adjusted under 35 U.S.C. 154(b) by 644 days.

(21) Appl. No.: 13/254,388

(22) PCT Filed: Mar. 1, 2010

(86) PCT No.: PCT/JP2010/001385
§ 371 (c)(1),
(2), (4) Date: Sep. 1, 2011

(87) PCT Pub. No.: WO2010/100886
PCT Pub. Date: Sep. 10, 2010

(65) Prior Publication Data
US 2011/0320141 A1    Dec. 29, 2011

(30) Foreign Application Priority Data

Mar. 3, 2009  (JP) ................. 2009-048791
Sep. 15, 2009  (JP) ................. 2009-212592

(51) Int. Cl.
*G01F 1/00*       (2006.01)
*G06F 19/00*      (2011.01)
*G01F 1/66*       (2006.01)

(52) U.S. Cl.
CPC ............. *G01F 1/66* (2013.01); *F23N 2025/06* (2013.01)

(58) Field of Classification Search
CPC ............. G01M 3/04; G01F 1/66; G01F 1/67; H03M 7/00; H03M 7/02; H03M 7/30
USPC .......................................................... 702/45
See application file for complete search history.

(56) References Cited

U.S. PATENT DOCUMENTS 8,874,623 B2 * 10/2014 Sanchez Loureda et al. . 707/812
2008/0270045 A1   10/2008 Miyata et al.
(Continued)

FOREIGN PATENT DOCUMENTS

JP    2006-038630 A       2/2006
JP    2006038630 A    *  2/2006
(Continued)

OTHER PUBLICATIONS

JP 2008 190832; English Machine Translation; Ishino et al.*
(Continued)

*Primary Examiner* — Eliseo Ramos Feliciano
*Assistant Examiner* — Terence Stifter, Jr.
(74) *Attorney, Agent, or Firm* — Brinks Gilson & Lione

(57) ABSTRACT

A flow rate measuring device simplifies calculation, reduces memory required for calculation, absorbs variations due to manual operation and, depending on the state of ignition, improves the accuracy of appliance identification by extracting features of appliances. The flow rate measuring device includes: a difference value conversion unit that converts into codes difference values of the flow rate measured at constant time intervals by an ultrasonic flowmeter; an appliance feature extraction unit creates an appliance feature code string indicating a feature of each appliance by, for example, making comparison and judgment using a third last code, a second last code, a last code and a current code of the codes obtained at constant time intervals, and by performing code deletion; and an identification unit performs appliance identification by comparing the appliance feature code string with an appliance inherent feature code string indicating the feature code string inherent in each appliance.

19 Claims, 22 Drawing Sheets

(56) References Cited

U.S. PATENT DOCUMENTS

| | | | |
|---|---|---|---|
| 2009/0018782 A1* | 1/2009 | Sameda et al. | 702/45 |
| 2011/0178732 A1 | 7/2011 | Iwamoto | |

FOREIGN PATENT DOCUMENTS

| JP | 2006-313114 A | | 11/2006 |
|---|---|---|---|
| JP | 2006313114 A | * | 11/2006 |
| JP | 2007-024750 A | | 2/2007 |
| JP | 2008-190832 A | | 8/2008 |
| JP | 2008190832 A | * | 8/2008 |
| JP | 2008-309498 A | | 12/2008 |
| WO | WO 2008/152812 A1 | | 12/2008 |

OTHER PUBLICATIONS

Machine translation of Miyata JP2006313114.*
Machine translation of Kawashima JP2006038630.*
Handwrittern translation of Ishino JP2008190832, p. 28-29, Par. 0126-136.*
Supplementary European Search Report in corresponding European Application No. 10 74 8485, dated Jun. 28, 2013, 8 pages.
International Search Report for International Application No. PCT/JP2010/001385, dated Mar. 30, 2010, 1 page.

* cited by examiner

FIG. 2

| ABSOLUTE FLOW RATE Q (n) | DIFFERENCE FLOW RATE ΔQ | CODE |
|---|---|---|
| $Q(n) \neq 0$ | $400 < |Q(n)|$ | F |
| | $300 < |Q(n)| \leq 400$ | E |
| | $250 < |Q(n)| \leq 300$ | D |
| | $200 < |Q(n)| \leq 250$ | C |
| | $175 < |Q(n)| \leq 200$ | B |
| | $150 < |Q(n)| \leq 175$ | A |
| | $125 < |Q(n)| \leq 150$ | 9 |
| | $100 < |Q(n)| \leq 125$ | 8 |
| | $75 < |Q(n)| \leq 100$ | 7 |
| | $50 < |Q(n)| \leq 75$ | 6 |
| | $40 < |Q(n)| \leq 50$ | 5 |
| | $30 < |Q(n)| \leq 40$ | 4 |
| | $20 < |Q(n)| \leq 30$ | 3 |
| | $10 < |Q(n)| \leq 20$ | 2 |
| | $|Q(n)| \leq 10$ | 1 |
| $Q(n) = 0$ | FLOW RATE ZERO | 0 |

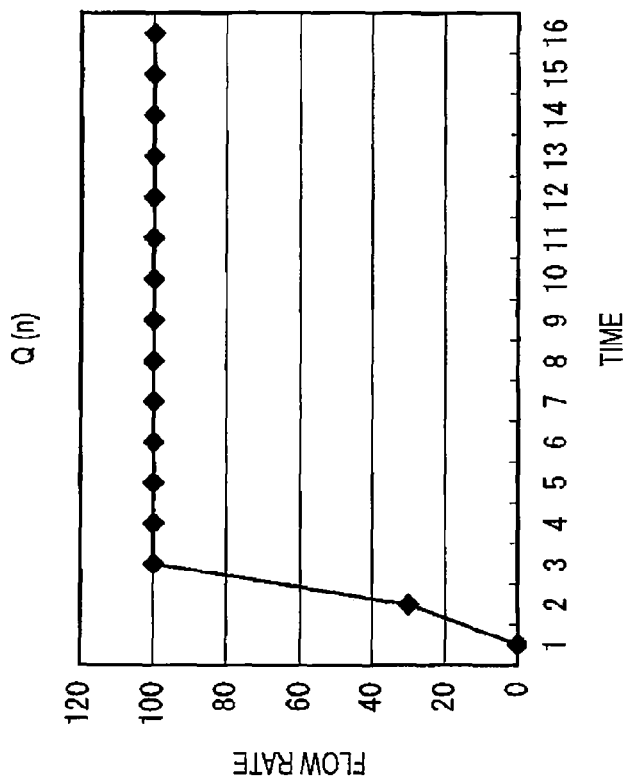

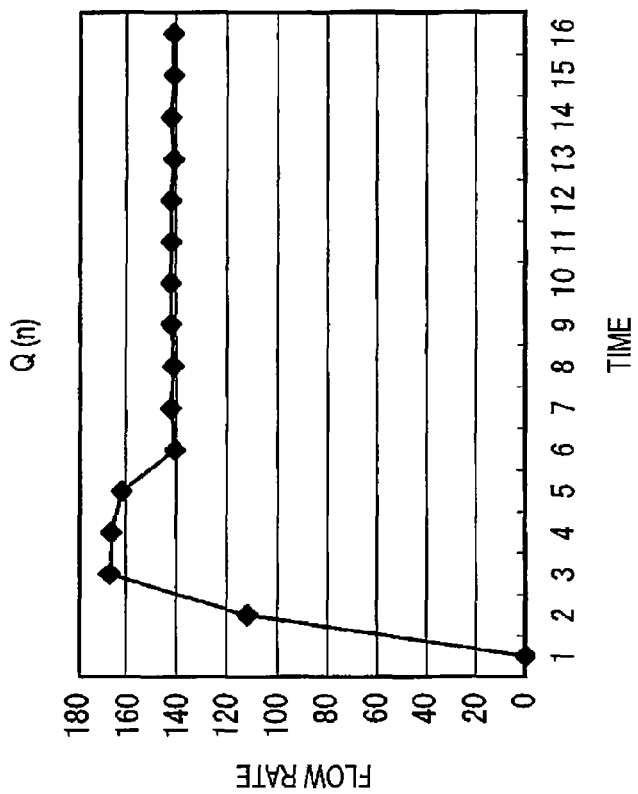

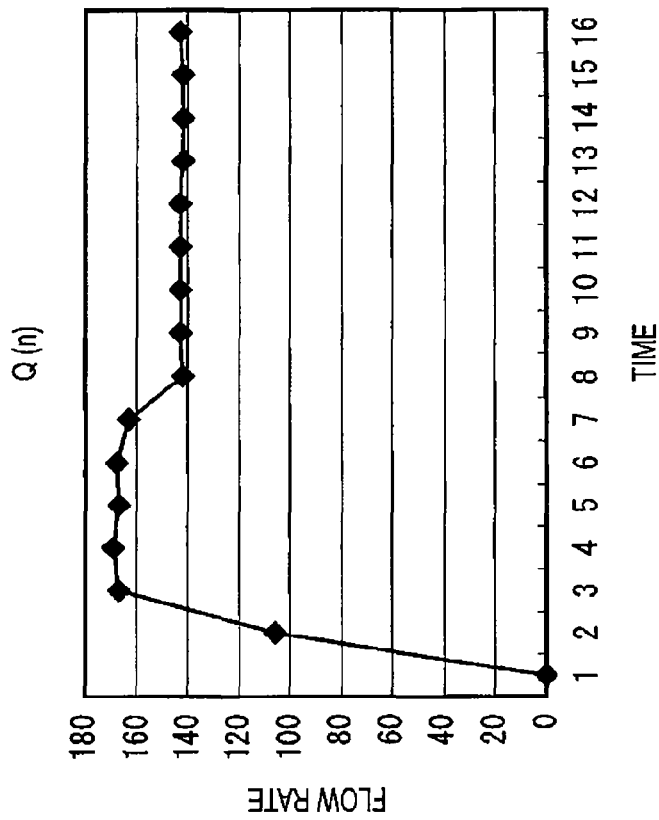

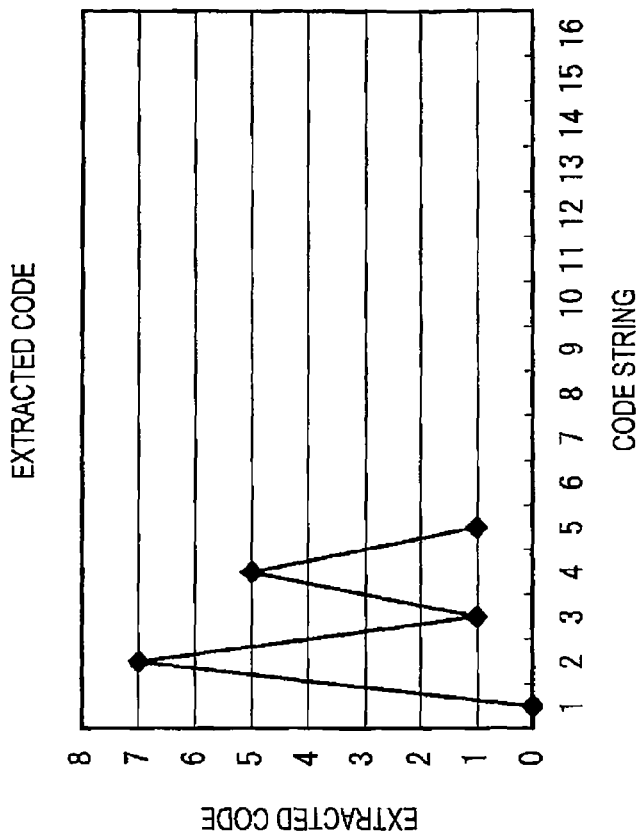

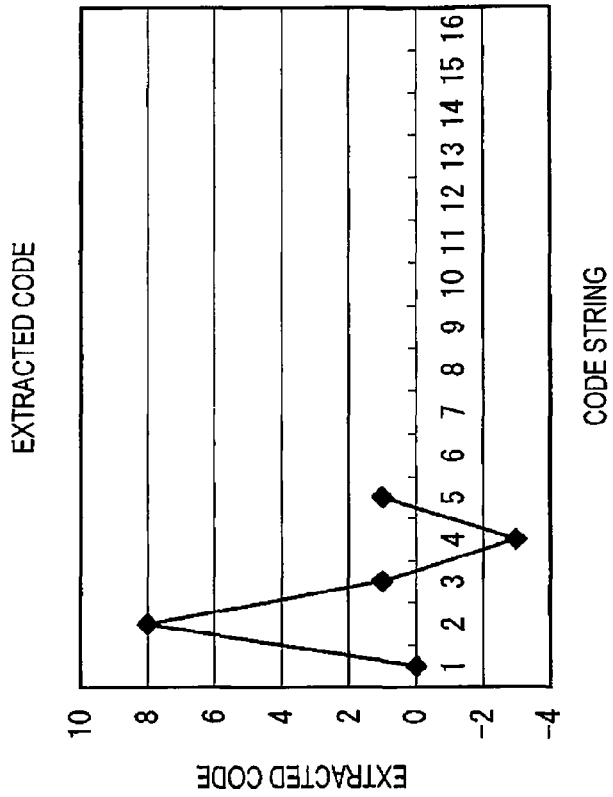

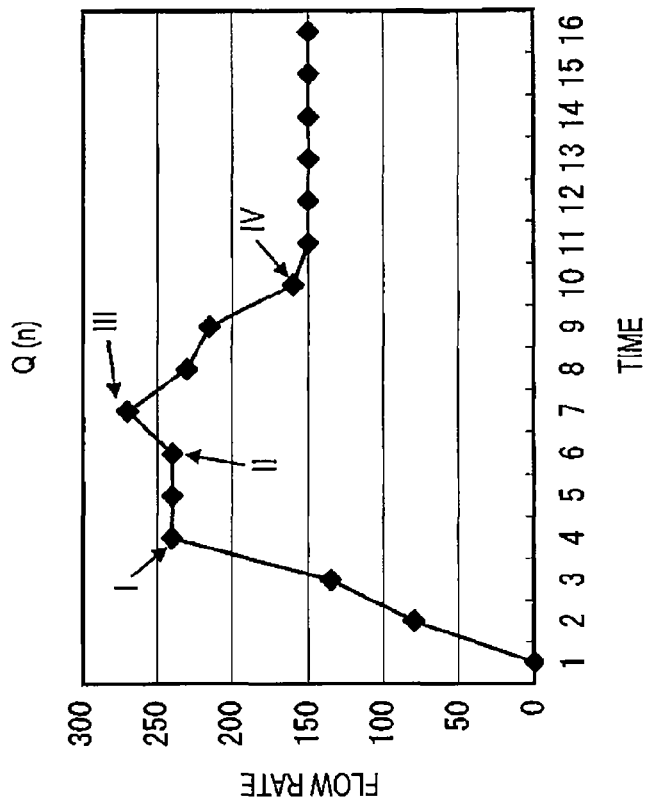

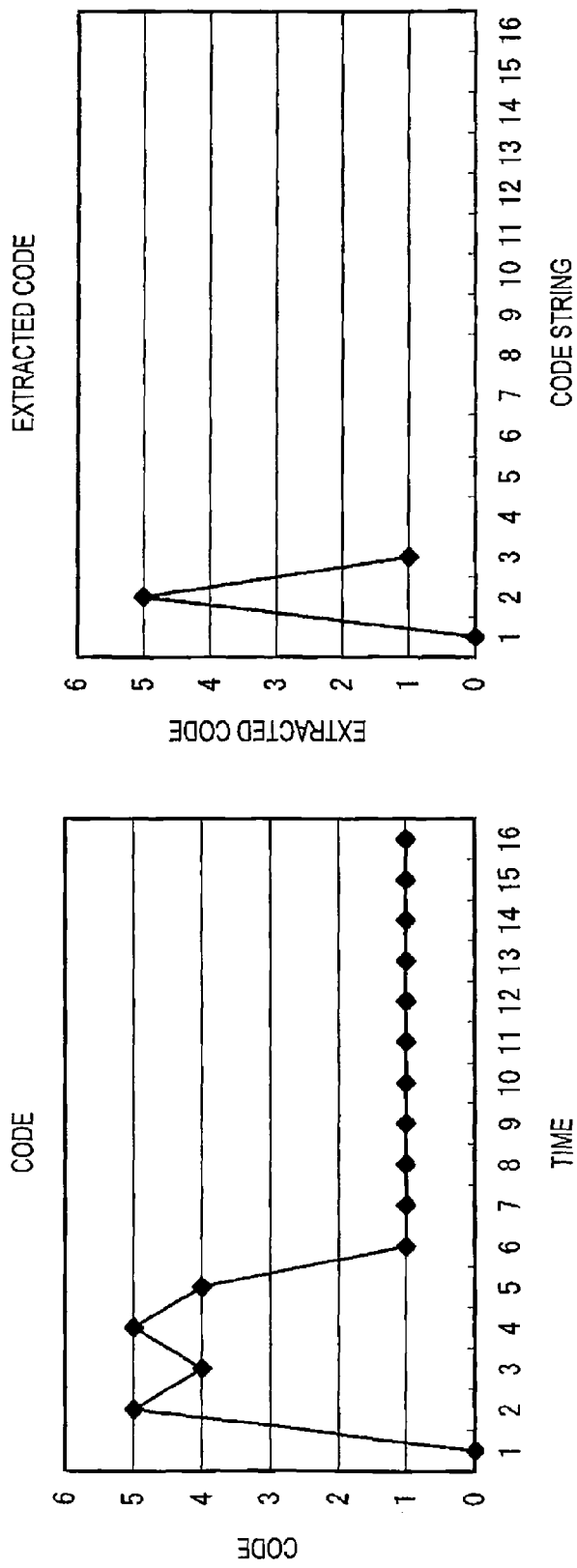

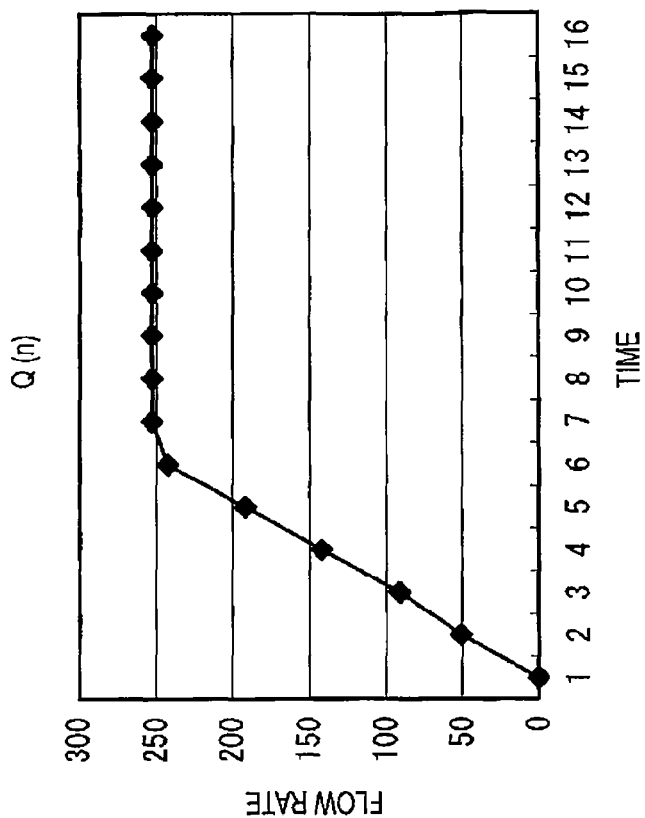

FLOW RATE MEASURING DEVICE

This application is a 371 application of PCT/JP2010/001385 having an international filing date of Mar. 1, 2010, which claims priority to JP2009-048791 filed on Mar. 3, 2009 and JP2009-212592 filed on Sep. 15, 2009, the entire contents of which are incorporated herein by reference.

TECHNICAL FIELD

The present invention relates to a technology for properly identifying an appliance that uses fluid by detecting the change of the flow rate of the fluid.

BACKGROUND ART

Conventionally, in a fluid piping system having a gas meter instrument, as a gas meter instrument for identifying an appliance being used, an instrument described in Patent document 1 is available. Its configuration will be described referring to FIG. 12. FIG. 12 is a block diagram showing a conventional gas meter.

As shown in FIG. 12, a gas meter instrument 1 is disposed in a flow passage 6 connected to a household gas supply pipe and is equipped with a flow rate measurement unit 3 for measuring the flow rate of gas at constant time intervals; a calculation unit 4 for obtaining the difference values of flow rate values output from the flow rate measurement unit 3; and a comparison judgment unit 7 for comparing the difference values calculated by the calculation unit 4 with a change judgment value registered in a storage unit 5 and for judging the change of the usage state of a gas appliance. The calculation unit 4, the comparison judgment unit 7 and a gas shut-off valve 2 are controlled by a control circuit 116.

The above-mentioned gas meter instrument 1 sequentially calculates the change of the difference values of the instantaneous flow rate output from the flow rate measurement unit 3 and judges the change of the usage state of the gas appliance according to the amount of the change, wherein registered data is compared with the change (difference values) of the gas flow rate measured, whereby the identification of gas appliances 13, 14 and 15 is made possible.

Furthermore, as a conventional method for identifying an appliance that uses fluid, a method described in Patent document 2 is available. Its configuration will be described referring to FIG. 13. FIG. 13 is a block diagram showing a conventional flow rate measuring device.

As shown in FIG. 13, a calculation unit 108 calculates the difference values of the gas flow rate measured by an ultrasonic flowmeter 104 at constant time intervals and a difference value conversion unit 112 classifies the difference values obtained at constant time intervals into predetermined classifications using the flow rate classification table 110a stored in a flow rate classification table storage unit 110 and converts the classifications into predetermined codes. An appliance identification unit 116 compares the code string generated by a code string generation unit 114 using the codes converted by the difference value conversion unit 112 with an appliance inherent feature code string being inherent in each appliance and stored in an appliance inherent code string information storage unit 118 to perform appliance identification.

In the above-mentioned configuration, code values obtained by coding (converting) the difference values of the flow rate are used, and the calculation is simplified when appliance identification is performed, whereby the speed of the calculation and the accuracy of the appliance identification are improved while the amount of memory required for the calculation, for example, is reduced.

Patent document 1: Japanese Patent Application Laid-Open Publication No. 2006-313114
Patent document 2: Japanese Patent Application Laid-Open Publication No. 2008-309498

SUMMARY OF THE INVENTION

Problem to be Solved by the Invention

However, in the conventional configuration described above, for example, in a gas table that is ignited using a pilot burner, its flow rate decreases when the user checks flame and releases his/her hand from its knob, and the time until the hand is released varies, or the slow ignition time of a fan heater, for example, varies depending on the state of ignition; hence, there is a problem that an erroneous judgment occurs when the flow rate difference values and the code string are compared with preliminarily registered data.

In order to solve the conventional problem described above, the present invention is intended to simplify calculation, to reduce the amount of a memory required for the calculation, to absorb variations due to manual operation and depending on the state of ignition, and to improve the accuracy of appliance identification by using a configuration in which the feature of an appliance is extracted.

Means for Solving the Problem

In order to solve the conventional problem described above, a flow rate measuring device according to the present invention is equipped with a flow rate measurement unit for measuring the flow rate of fluid at constant time intervals; a calculation unit for calculating the difference values of the flow rate measured by the flow rate measurement unit at constant time intervals; a flow rate classification table in which the classifications of a plurality of difference values depending on the magnitudes of the difference values are associated with codes representing the classifications; a difference value conversion unit for converting the difference values calculated by the calculation unit into codes on the basis of the flow rate classification table; an appliance feature extraction unit for generating an appliance feature code string indicating the feature of an appliance from the codes obtained at constant time intervals by the difference value conversion unit; and an appliance identification unit for performing appliance identification by comparing the appliance feature code string with an appliance inherent feature code string indicating the feature code string inherent in each appliance, wherein the appliance feature extraction unit is configured so as to create an appliance feature code string by making comparison and judgment using the fourth last code, the third last code, the second last code, the last code and the current code obtained by the difference value conversion unit and by performing code deletion, etc.;

With this configuration, an appliance feature can be extracted depending on the degree of increase/decrease of the flow rate, that is, the increase/decrease of the code, and the variations thereof can be absorbed, whereby stable appliance feature extraction can be accomplished.

Advantageous Effect of the Invention

The flow rate measuring device according to the present invention can simplify calculation, reduce the amount of a memory required for the calculation, absorb variations due to manual operation and depending on the state of ignition, and improve the accuracy of appliance identification by using a configuration in which the feature of an appliance is extracted.

BRIEF DESCRIPTION OF THE DRAWINGS

FIG. 2 is a view showing an example of a flow rate classification table according to Embodiments 1 to 5 of the present invention;

FIG. 7(a) is a view showing a concept in which the flow rate difference values at the time when the gas appliance A is used are classified according to the flow rate classification table in Embodiment 2 of the present invention, FIG. 7(b) is a graph showing a code string obtained by extracting the feature at the time when the gas appliance A is used, FIG. 7(c) is a view showing a concept in which the flow rate difference values at the time when the gas appliance C is used are classified according to the flow rate classification table in Embodiment 2 of the present invention, and FIG. 7(d) is a graph showing a code string in which the feature at the time when the gas appliance C is used is extracted;

DETAILED DESCRIPTION OF THE PREFERRED EMBODIMENTS

Figure 1:
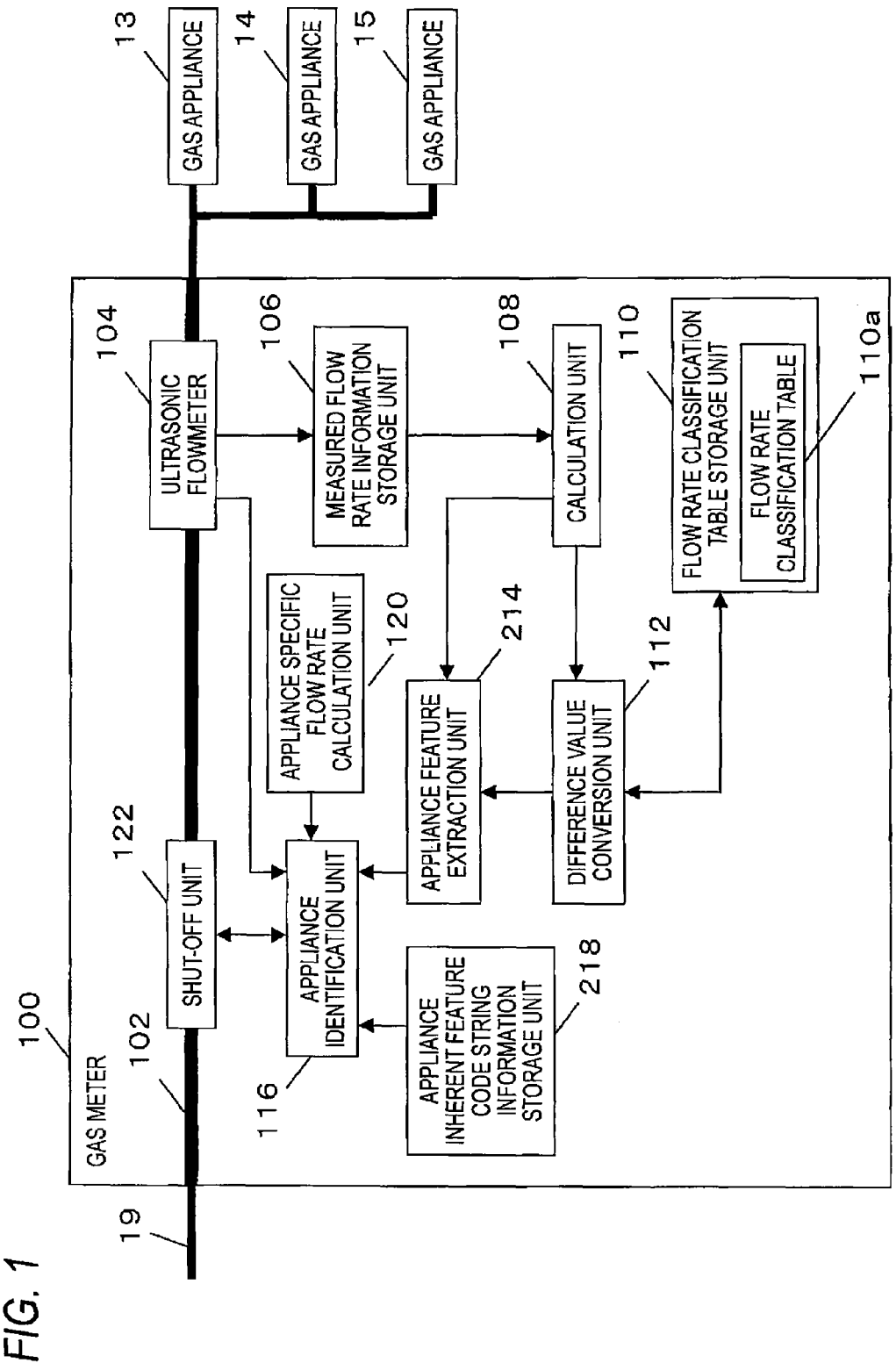
FIG. 1 is a block diagram of a flow rate measuring device according to Embodiments 1 to 5 of the present invention.

A first invention has a configuration equipped with a flow rate measurement unit for measuring the flow rate of fluid flowing through a flow passage at constant time intervals; a calculation unit for calculating the difference values of the flow rate measured by the flow rate measurement unit at constant time intervals; a flow rate classification table in which the classifications of a plurality of difference values depending on the magnitudes of the difference values are associated with codes representing the classifications; a difference value conversion unit for converting the difference values calculated by the calculation unit into codes on the basis of the flow rate classification table; an appliance feature extraction unit for generating an appliance feature code string indicating the feature of an appliance from the codes obtained at constant time intervals by the difference value conversion unit; and an appliance identification unit for performing appliance identification by comparing the appliance feature code string with an appliance inherent feature code string indicating the feature code string inherent in each appliance, wherein in the case that the last code of the codes obtained by the difference value conversion unit is larger than the second last code and the last code is larger than the current code or in the case that the last code is smaller than the second last code and the last code is smaller than the current code, the appliance feature extraction unit stores the current code in the appliance feature code string; and in the other cases, the extraction unit overwrites the current code on the last code stored in the appliance feature code string to compress the appliance feature code string.

With this configuration, an appliance feature can be extracted depending on the degree of increase/decrease of the flow rate, that is, the increase/decrease of the code.

A second invention is characterized in that the appliance feature extraction unit according to the first invention, in particular, is configured so as to add a minus sign to codes in the case that the difference values calculated by the calculation unit are minus and the codes obtained by the difference value conversion unit are other than a predetermined code and so as not to overwrite the current code on the last code stored in the appliance feature code string in the case that the last code is plus and the current code is minus.

With this configuration, increase/decrease information can be added to the feature of each appliance depending on the increase/decrease of the code, whereby identification can be performed depending on the increase/decrease even if the same code is used.

A third invention is characterized in that the appliance feature extraction unit according to the first invention, in particular, is configured so as to delete the last code and the second last code stored in the appliance feature code string and to overwrite the current code on the second last code stored in the appliance feature code string to compress the appliance feature code string in the case that the difference between the last code and the second last code is equal to or less than a predetermined value and the second last code is smaller than the current code when the change of the codes obtained by the difference value conversion unit has an N-shaped characteristic, that is, the second last code is larger than the third last code, the last code is smaller than the second last code, and the current code is larger than the last code, or in the case that the difference between the last code and the second last code is equal to or less than the predetermined value and the second last code is larger than the current code when the change of the codes obtained by the difference value conversion unit has an inverted N-shaped characteristic, that is, the second last code is smaller than the third last code, the last code is larger than the second last code, and the current code is smaller than the last code.

With this configuration, an appliance feature can be extracted depending on the degree of increase/decrease of the flow rate, that is, the increase/decrease of the code, and the variations thereof can be absorbed, whereby stable appliance feature extraction can be accomplished.

A fourth invention has a configuration wherein the last code and the second last code stored in the appliance feature code string are deleted and the current code is overwritten on the second last code stored in the appliance feature code string to compress the appliance feature code string in the case that the difference between the last code and the second last code is equal to or less than a predetermined value and the second last code is equal to the current code when the change of the codes obtained by the difference value conversion unit has an M-shaped characteristic, that is, the third last code is larger than the fourth last code, the second last code is smaller than the third last code, the last code is larger than the second last code, and the current code is smaller than the last code, or in the case that the difference between the last code and the second last code is equal to or less than the predetermined value and the second last code is equal to the current code when the change of the codes obtained by the difference value conversion unit has a W-shaped characteristic, that is, the third last code is smaller than the fourth last code, the second last code is larger than the third last code, the last code is smaller than the second last code, and the current code is larger than the last code.

With this configuration, an appliance feature can be extracted depending on the degree of increase/decrease of the flow rate, that is, the increase/decrease of the code, and the variations thereof can be absorbed, whereby stable appliance feature extraction can be accomplished.

A fifth invention is characterized in that the appliance feature extraction unit according to the first invention, in particular, is configured so as to delete the final code from the appliance feature code string in the case that the absolute value of the final code in the appliance feature code string is equal to or more than a predetermined value.

With this configuration, the code that appears when the artificial switching of the amount of combustion is performed can be deleted from the appliance feature code string, whereby stable appliance feature extraction can be accomplished.

A sixth invention provides a program for causing a computer to function as the whole or part of the flow rate measuring device according to any one of the first to fifth inventions. Furthermore, due to use of the program, at least part of the program of the present invention can be accomplished using a general-purpose computer or a server. Moreover, the program can be distributed and installed easily by recording the program on recording media or by delivering the program via a communication network.

Since the object of the present invention can be attained by making the main sections of the first to fifth inventions to conform to the embodiments thereof, the details of the embodiments corresponding to respective claims will be described below referring to the drawings, and the best modes for implementing the present invention will be described. However, the present invention is not limited by the embodiments. Still further, components having the same configuration and the same working effect are designated by the same code and duplicate descriptions are not performed.

Embodiment 1

FIG. 1 is a block diagram of a flow rate measuring device according to Embodiment 1 of the present invention.

In FIG. 1, a gas meter 100 is equipped with a flow passage 102, an ultrasonic flowmeter 104 serving as a flow rate measurement unit, a measured flow rate information storage unit 106, a calculation unit 108, a flow rate classification table storage unit 110, a difference value conversion unit 112, an appliance feature extraction unit 214, an appliance identification unit 116, and an appliance inherent feature code string information storage unit 218. Furthermore, the gas meter 100 includes a shut-off unit 122 disposed in the flow passage 102 to shut off gas in an emergency, for example.

The ultrasonic flowmeter 104 emits ultrasonic waves at constant time intervals to gas serving as fluid flowing in the flow passage 102 and measures the flow rate of the gas, and a general-purpose type can be used. The measured flow rate information storage unit 106 stores target data in which the measured flow rate values measured by the ultrasonic flowmeter 104 and the measurement times at which the measured flow rate values were measured are described while being associated with each other.

The calculation unit 108 calculates the difference values of the flow rate of the gas measured by the ultrasonic flowmeter 104 at constant time intervals corresponding to the above-mentioned ultrasonic wave emitting intervals. For example, in FIG. 3 described later, in the case that the flow rate (absolute flow rate) at a predetermined timing is 90 L/h (litters per hour) and the flow rate at the next timing is 145 L/h, the difference value at this time is calculated as 145−90=55 (L/h). The flow rate classification table storage unit 110 stores a flow rate classification table 110a shown in FIG. 2 in which the classifications of a plurality of difference values, corresponding to the magnitudes of the difference values, are associated with codes representing the respective classifications. FIG. 2 is a view showing an example of a flow rate classification table according to Embodiment 1. The flow rate classification table 110a plays a role of a conversion table in which the absolute values of the measured difference values are classified into predetermined classifications and converted into predetermined codes representing the classifications. The number of the classifications of the flow rate classification table 110a is not limited particularly; FIG. 2 shows 16 code classifications as an example. Although a region in which the flow rate is judged zero is given, since the measured flow rate has some variations in an actual instrument, the flow rate scarcely becomes complete zero. Hence, a case in which the flow rate becomes zero includes a case in which the flow rate is nearly zero or substantially zero.

Furthermore, with respect to the ranges of the respective classifications, segmentation is done while the classifications have different flow rate intervals. Fine segmentation is done for smaller flow rate difference values; for example, the interval is 10 L/h in code 1 to code 5, 25 L/h in code 6 to code B, 50 L/h in code C to code D, and 100 L/h in code E. With this configuration, since there are numerous kinds of appliances in the regions having small difference values, the accuracy of identification can be raised by making the intervals small.

Since the letters A to F of the codes are hexadecimal representation of numbers 10 to 15, the codes can be used as numbers and compared in large-small relation.

The difference value conversion unit 112 converts the difference values calculated by the calculation unit 108 into the codes representing the classifications in which the difference values at constant time intervals of the ultrasonic wave emission on the basis of the flow rate classification table 110a.

The appliance feature extraction unit 214 generates an extracted code string indicating the feature of an appliance from a measured code string serving as a string of codes obtained by actual measurement on the basis of a set of codes obtained at constant time intervals by the difference value conversion unit 112. This measured code string is a pseudo-representation of the flow rate change of the fluid. The appliance feature extraction unit 214 records the extracted code string representing the feature of the appliance in a memory (not shown) as necessary.

The appliance identification unit 116 identifies a gas appliance that uses gas as fluid on the basis of the extracted code string extracted by the appliance feature extraction unit 214. At this time, the appliance identification unit 116 compares the extracted code string with an appliance inherent feature code string indicating a feature code string inherent in each gas appliance and stored beforehand in the appliance inherent feature code string information storage unit 218 for each gas appliance and then identifies the gas appliance that uses the gas according to the analogous relationship therebetween, for example.

An appliance specific flow rate calculation unit 120 can also calculate the flow rate of each gas appliance identifies by the appliance identification unit 116. In addition, the gas meter 100 is connected to a gas pipe line 19 on the upstream side and connected to various gas appliances 13, 14 and 15, such as a gas table, a fan heater and a floor heating appliance, on the downstream side.

In the flow rate measuring device configured as described above, its operation for appliance feature extraction processing will be described below.

First, a flow rate (absolute flow rate) Q(n) measured at constant time intervals (for example, 0.5 seconds) by the ultrasonic flowmeter 104 and a flow rate Q(n−1) measured at the last time are once stored in the measured flow rate information storage unit 106. Then, a difference value ΔQ(n)=Q(n)−Q(n−1), that is, the difference between the flow rate Q(n) and the flow rate Q(n−1) measured at the last time, is calculated by the calculation unit 108. The constant time may be herein one or two seconds.

Figure 3:
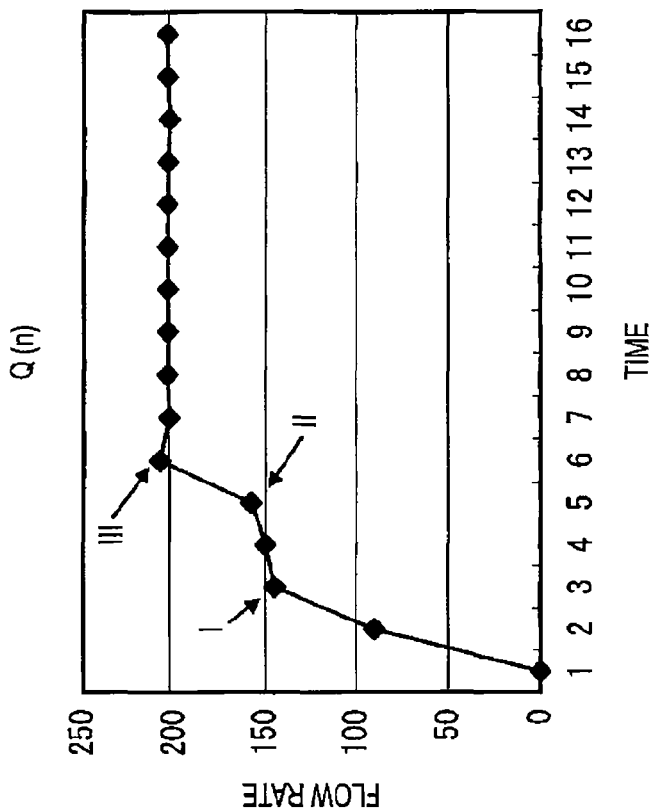
FIG. 3(a) is a view showing a concept in which the flow rate difference values at the time when a gas appliance A is used are classified according to a flow rate classification table in Embodiment 1 of the present invention.
FIG. 3(b) is a graph showing a flow rate characteristic at the time when the gas appliance A is used.
FIG. 3(c) is a graph showing classified codes at the time when the gas appliance A is used.
FIG. 3(d) is a graph showing a code string in which the feature at the time when the gas appliance A is used is extracted.
Figure 3:
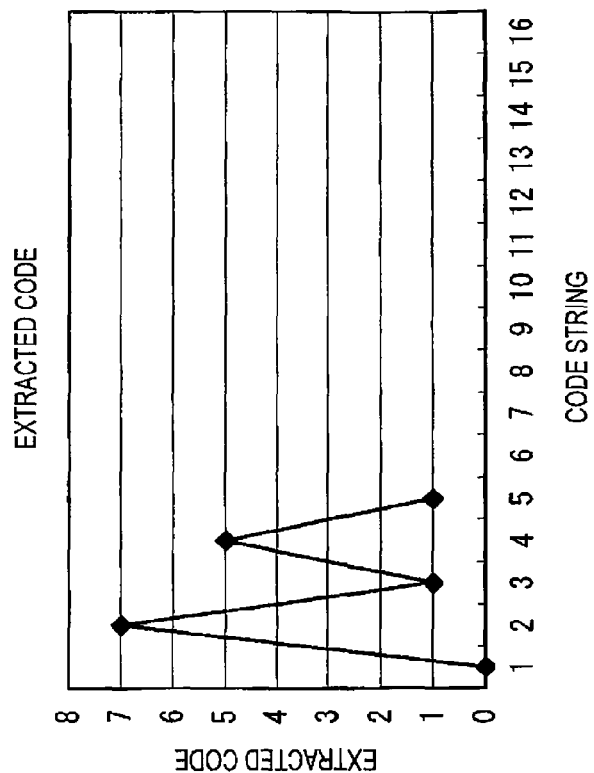
Figure 3:
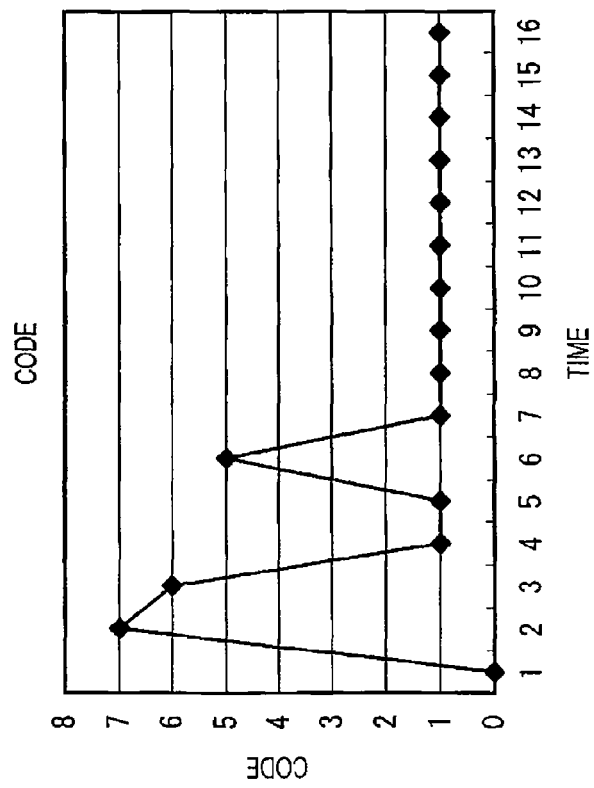

The difference value conversion unit 112 converts the absolute values of the difference values ΔQ(n) calculated by the calculation unit 108 into classification codes representing classification in which the difference values at constant time intervals are classified referring to the flow rate classification table 110a of FIG. 2. FIG. 3 shows an example of the conversion performed using this kind of flow rate classification table. FIG. 3(a) is a view showing a concept in which the flow rate difference values at the time when a gas appliance A is used are classified according to the flow rate classification table in Embodiment 1. FIG. 3(b) is a graph showing a flow rate characteristic at the time when the gas appliance A is used. FIG. 3(c) is a graph showing classified codes at the time when the gas appliance A is used. FIG. 3(d) is a graph showing a code string in which the feature at the time when the gas appliance A is used is extracted. When the gas appliance A (for example, a fan heater) corresponding to any one of the gas appliances 13, 14 and 15 of FIG. 1 is started and a gas flow rate is generated, the flow rate to be measured changes from the flow rate Q(n)=0 to the flow rate Q(n)≠0 as shown in the graph of FIG. 3(b); the flow rate changes depending on the used amount of gas. Concurrently with the flow rate measurement using the ultrasonic flowmeter 104, the calculation unit 108 calculates the difference values and the difference value conversion unit 112 performs conversion into the classification codes.

Among the codes obtained as the result of the conversion, that is, the codes converted by the difference value conversion unit 112, in the case that the last code is larger than the second last code and the last code is larger than the current code or in the case that the last code is smaller than the second last code and the last code is smaller than the current code, the appliance feature extraction unit 214 performs processing for storing the current code in the appliance feature code string serving as a memory; and in the other cases, the extraction unit performs processing for overwriting the current code on the last code stored in the appliance feature code string. With this processing, a code string [07151] extracted from a code string [07611511111111111] at constant time intervals shown in FIG. 3 is stored in the appliance feature code string. In other words, by virtue of this processing, it is possible to extract the peak values of the codes in the range from the start of the gas appliance A to the change point I, in the range from the change point I to the change point II and in the range from the change point II to the change point III shown in FIG. 3(b). This extracted code string is shown in the graph of FIG. 3(d), and the fact that the feature of the appliance is extracted sufficiently is understood more easily from this graph than from the graph of FIG. 3(c) showing the code string before the extraction, although the amount of the information is compressed.

Figure 4:
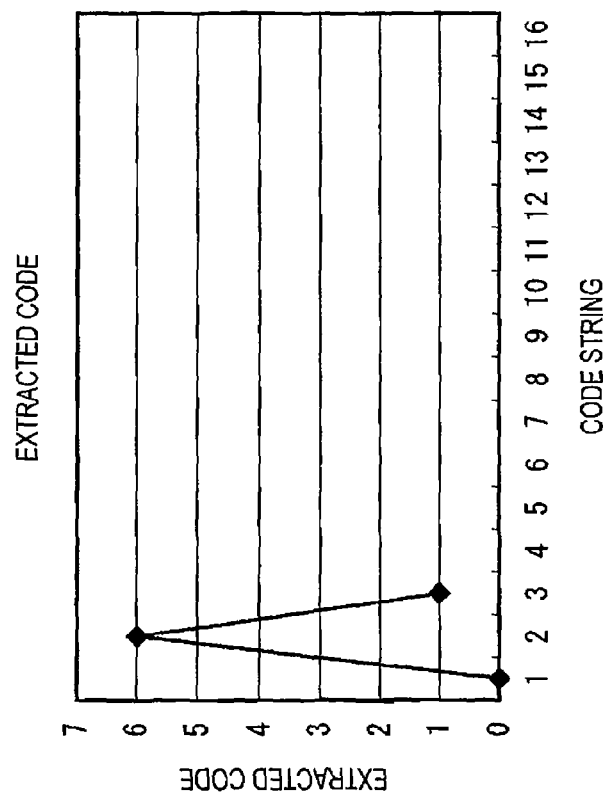
FIG. 4(a) is a view showing a concept in which the flow rate difference values at the time when a gas appliance B is used are classified according to the flow rate classification table in Embodiment 1 of the present invention.
FIG. 4(b) is a graph showing a flow rate characteristic at the time when the gas appliance B is used.
FIG. 4(c) is a graph showing classified codes at the time when the gas appliance B is used.
FIG. 4(d) is a graph showing a code string in which the feature at the time when the gas appliance B is used is extracted.
Figure 4:
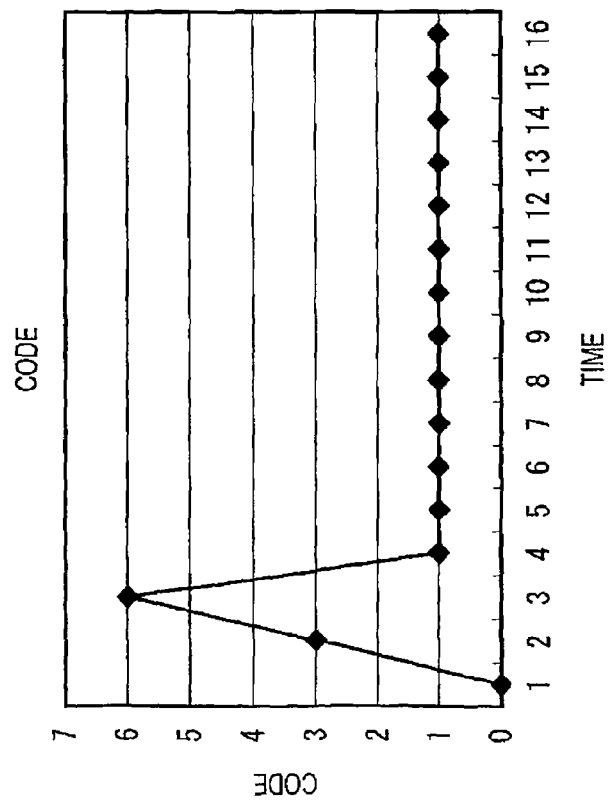

Similarly, FIG. 4 is a view showing the concept of feature extraction at the time when a gas appliance B is used. FIG. 4(a) is a view showing a concept in which the flow rate difference values at the time when the gas appliance B is used are classified according to the flow rate classification table in Embodiment 1. FIG. 4(b) is a graph showing a flow rate characteristic at the time when the gas appliance B is used. FIG. 4(c) is a graph showing classified codes at the time when the gas appliance B is used. FIG. 4(d) is a graph showing a code string in which the feature at the time when the gas appliance B is used is extracted. In the case of the gas appliance B (for example, a push-lever type gas table), a code string [061] extracted from a code string [0361111111111111] at constant time intervals, converted by the difference value conversion unit 112, is stored in the appliance feature code string.

When the extracted appliance feature code string in the case of the above-mentioned gas appliance A is herein compared with that in the case of the gas appliance B, two peaks appear in the case of the gas appliance A, that is, in the graph of FIG. 3(d), but only one peak appears in the case of the gas appliance B, that is, in the graph of FIG. 4(d). This is due to the fact that slow ignition operation is performed in the appliance A, and this makes it possible to clearly identify that the appliance is the appliance A different from the appliance B.

The rising characteristic of each of gas appliances described above, that is, the feature code inherent in each gas appliance, is stored beforehand in the appliance inherent feature code string information storage unit 218; if the obtained appliance feature code string is [07151], the gas appliance being used can be identified as the gas appliance A; and if the obtained appliance feature code string is [061], the gas appliance being used can be identified as the gas appliance B.

Figure 5:
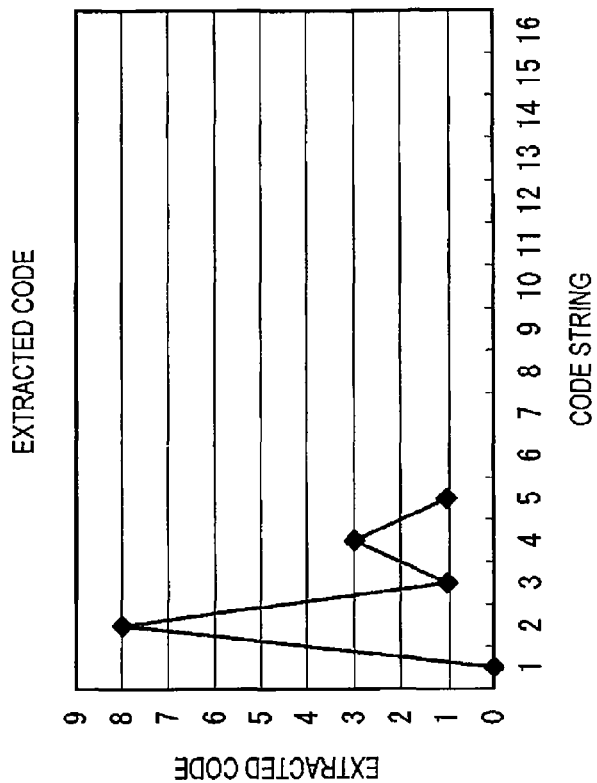
FIG. 5(a) is a view showing a concept in which the flow rate difference values at the time when a gas appliance C is used are classified according to the flow rate classification table in Embodiment 1 of the present invention.
FIG. 5(b) is a graph showing a flow rate characteristic at the time when the gas appliance C is used.
FIG. 5(c) is a graph showing classified codes at the time when the gas appliance C is used.
FIG. 5(d) is a graph showing a code string in which the feature at the time when the gas appliance C is used is extracted.
Figure 5:
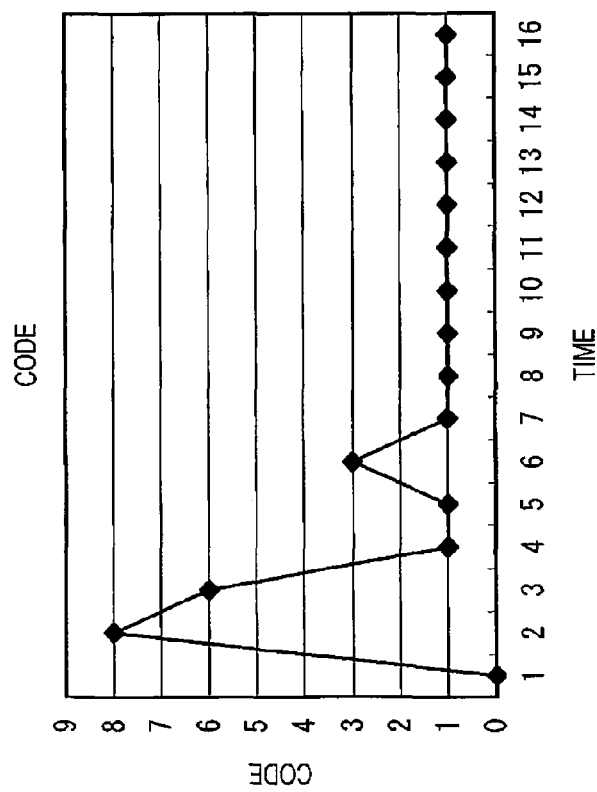
Figure 6:
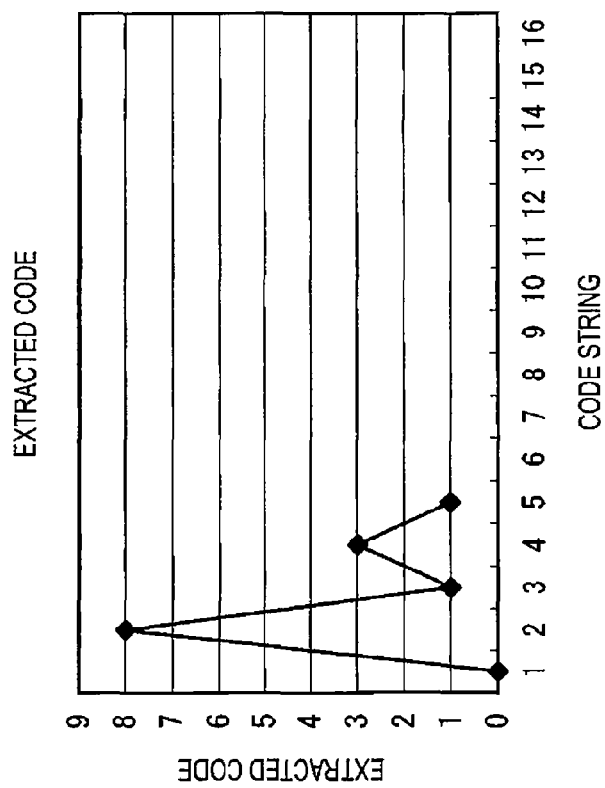
FIG. 6(a) is a view showing a concept in which the flow rate difference values at the time when the gas appliance C is used are classified according to the flow rate classification table in Embodiment 1 of the present invention.
FIG. 6(b) is a graph showing a flow rate characteristic at the time when the gas appliance C is used.
FIG. 6(c) is a graph showing classified codes at the time when the gas appliance C is used.
FIG. 6(d) is a graph showing a code string in which the feature at the time when the gas appliance C is used is extracted.
Figure 6:
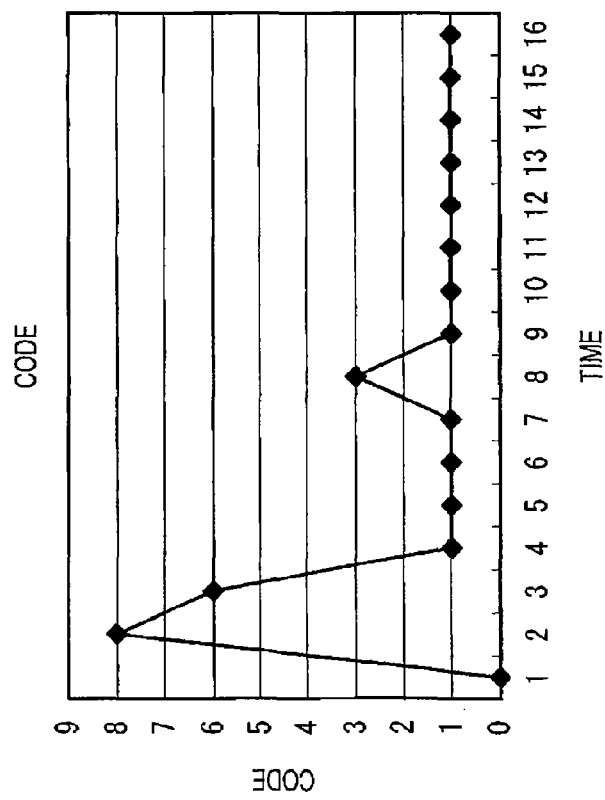

Next, FIGS. 5 and 6 are views showing the concepts of feature extraction at the time when a gas appliance C is used. FIG. 5(a) is a view showing a concept in which the flow rate difference values at the time when the gas appliance C is used are classified according to the flow rate classification table in Embodiment 1. FIG. 5(b) is a graph showing a flow rate characteristic at the time when the gas appliance C is used. FIG. 5(c) is a graph showing classified codes at the time when the gas appliance C is used. FIG. 5(d) is a graph showing a code string in which the feature at the time when the gas appliance C is used is extracted. FIG. 6(a) is a view showing a concept in which the flow rate difference values at the time when the gas appliance C is used are classified according to the flow rate classification table in Embodiment 1. FIG. 6(b) is a graph showing a flow rate characteristic at the time when the gas appliance C is used. FIG. 6(c) is a graph showing classified codes at the time when the gas appliance C is used. FIG. 6(d) is a graph showing a code string in which the feature at the time when the gas appliance C is used is extracted. In the gas appliance C, an appliance equipped with a pilot burner (for example, a pilot-burner push-turn type gas table), the pilot burner is extinguished by releasing the hand after ignition, whereby the flow rate of gas decreases at this time. However, since the time until the hand is released varies, the code string at constant time intervals, converted by the difference value conversion unit 112, becomes [0861131111111111] in the example of FIG. 5 and becomes [0861111311111111] in the example of FIG. 6, whereby the gas appliances cannot be identified as the same gas appliance. However, by performing the feature extraction processing in Embodiment 1, the code string extracted from the code string at regular time intervals, converted by the difference value conversion unit 112, becomes [08131] in the case of FIG. 5, and the extracted code string becomes [08131] in the case of FIG. 6; the same code string is obtained. As a result, the gas appliances can be identified as the same gas appliance.

Moreover, although two peaks appear in the graph of FIG. 5(d) for the gas appliance C as in the case of the graph of FIG. 3(d) for the above-mentioned gas appliance A, identification can be performed because there is a difference in the height of the second peak (the magnitude of the code). Not only the extracted appliance feature code string but also a stable flow rate value (for example, 204 L/h in FIG. 3, 143 L/h in FIG. 5) may be additionally used as an identification judgment condition.

As described above, in Embodiment 1, the feature of an appliance from a code string at constant time intervals converted by the difference value conversion unit 112 is extracted by the appliance feature extraction unit 214; hence, accurate appliance identification can be performed, and the code string can be compressed by the feature extraction, whereby the size of the memory can be made small.

Embodiment 2

FIG. 7 is a view showing the concept of feature extraction in Embodiment 2 of the present invention. FIG. 7(a) is a view showing a concept in which the flow rate difference values at the time when the gas appliance A is used are classified according to the flow rate classification table in Embodiment 2. FIG. 7(b) is a graph showing a code string obtained by extracting the feature at the time when the gas appliance A is used. FIG. 7(c) is a view showing a concept in which the flow rate difference values at the time when the gas appliance C is used are classified according to the flow rate classification table in Embodiment 2 FIG. 7(d) is a graph showing a code string in which the feature at the time when the gas appliance C is used is extracted. As described in Embodiment 1, appliance identification can be performed according to the appliance feature code string extracted by the appliance feature extraction unit 214; however, when the same gas appliance is used repeatedly and in the case that the difference flow rate values become close to the threshold value of the code classification because of variations in the flow rate, for example, there is a possibility that the appliance feature code string may become different. Hence, for example, when the appliance inherent feature code string stored beforehand in the appliance inherent feature code string information storage unit 218 is compared with the extracted appliance feature code string, the respective codes of the appliance feature code string are allowed to vary up to ±1, and it is assumed that the appliances are the same, whereby erroneous identification is prevented.

When the graph of FIG. 3(d) indicating the appliance feature code string of the above-mentioned gas appliance A is herein compared with the graph of FIG. 5(d) indicating the appliance feature code string of the gas appliance C and in the case that the respective codes of the appliance feature code string are allowed to vary up to ±1 and in the case that the code of the second peak is 4, it is understood that there is a possibility of erroneous identification. However, this erroneous identification can be prevented by additionally using the above-mentioned stable flow rate for the identification.

Hence, in addition to the feature extraction processing described in Embodiment 1, the appliance feature extraction unit 214 performs processing for adding a minus sign to codes in the case that the difference values calculated by the calculation unit 108 are minus and the codes obtained by the difference value conversion unit 112 are other than a predetermined code and for not overwriting the current code on the last code stored in the appliance feature code string in the case that the last code is plus and the current code is minus. At this time, the predetermined code assumed to be [1].

By virtue of this processing, in the case of the gas appliance A, as shown in FIG. 7(a), the code string at constant time intervals converted by the difference value conversion unit 112 becomes, and a code string [07151] extracted from this is stored in the appliance feature code string.

Similarly, in the case of the gas appliance C, as shown in FIG. 7(c), the code string at constant time intervals converted by the difference value conversion unit 112 becomes [08611-31111111111], and a code string [081-31] extracted from this is stored in the appliance feature code string. Hence, the gas appliance A and the gas appliance C can be distinguishably identified definitely.

As described above, in Embodiment 2, the feature of an appliance including flow rate increase/decrease information from a code string at constant time intervals converted by the difference value conversion unit 112 is extracted by the appliance feature extraction unit 214; hence, accurate appliance identification can be performed, and the code string can be compressed by the feature extraction, whereby the size of the memory can be made small.

Embodiment 3

Figure 8:
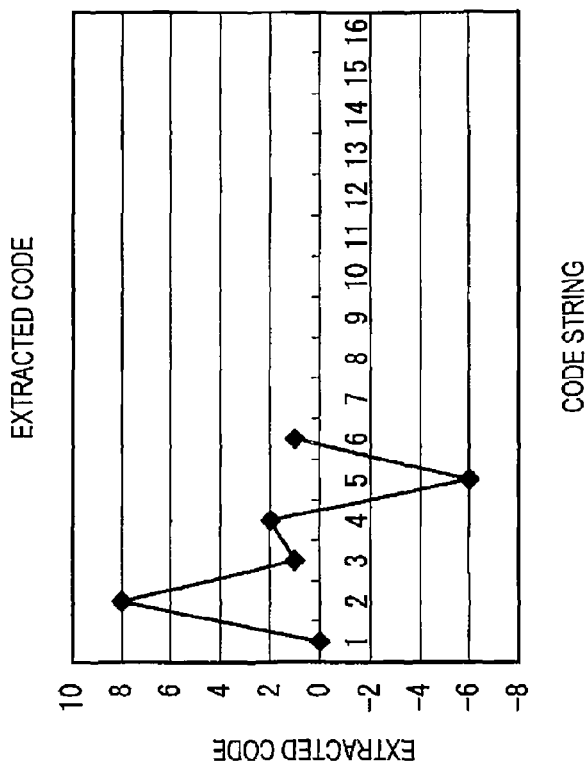
FIG. 8(a) is a view showing a concept in which the flow rate difference values at the time when a gas appliance D is used are classified according to the flow rate classification table in Embodiment 3 of the present invention.
FIG. 8(b) is a graph showing a flow rate characteristic at the time when the gas appliance D is used.
FIG. 8(c) is a graph showing classified codes at the time when the gas appliance D is used.
FIG. 8(d) is a graph showing a code string in which the feature at the time when the gas appliance D is used is extracted.
Figure 8:
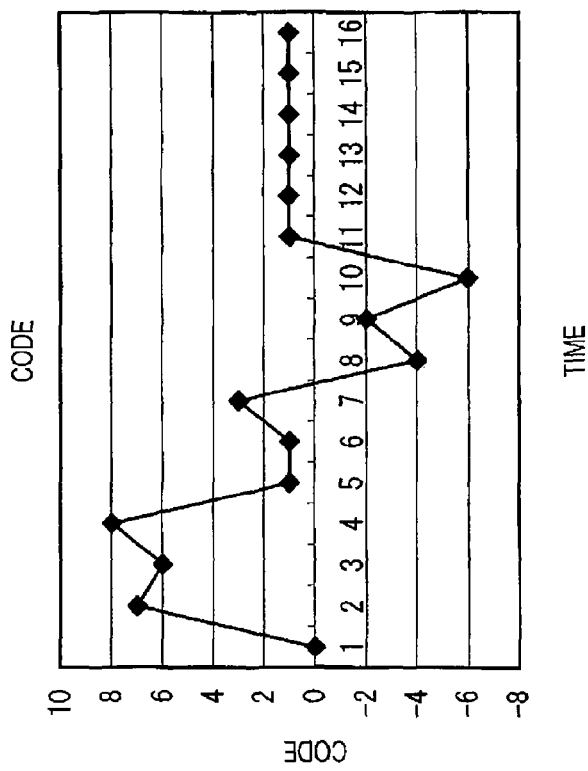

FIG. 8 is a view showing the concept of feature extraction in Embodiment 3 of the present invention. FIG. 8(a) is a view showing a concept in which the flow rate difference values at the time when a gas appliance D is used are classified according to the flow rate classification table in Embodiment 3. FIG. 8(b) is a graph showing a flow rate characteristic at the time when the gas appliance D is used. FIG. 8(c) is a graph showing classified codes at the time when the gas appliance D is used. FIG. 8(d) is a graph showing a code string in which the feature at the time when the gas appliance D is used is extracted. In the case of the gas appliance D having the flow rate rising characteristic shown in FIG. 8(b), the code string at constant time intervals converted by the difference value conversion unit 112 becomes [0768113-4-2-6111111] as shown in FIG. 8(a). This is shown in the graph of FIG. 8(c).

When the change from the rising of the flow rate to the change point I shown in FIG. 8(b) is observed, it is found that the change has a rightward rising inclination as a whole although there are differences in the inclination of the flow rate characteristic. Similarly, when the change from the change point III to the change point IV shown in FIG. 8(b) is observed, it is found that the change has a rightward lowering inclination as a whole although there are differences in the inclination of the flow rate characteristic.

However, the code string in the zone corresponding to the range from the rising of the flow rate to the change point I shown in FIG. 8(b) is [0768] and has an N-shaped characteristic as shown in FIG. 8(c). Furthermore, the code string in the zone corresponding to the range from the change point III to the change point IV shown in FIG. 8(b) is [3-4-2-6] and has an inverted N-shaped characteristic as shown in FIG. 8(c).

In other words, although the flow rate characteristic is generally rightward rising or rightward lowering, the code string has the N-shaped characteristic or the inverted N-shaped characteristic; hence, it cannot be said definitely that there is coincidence in the feature.

Hence, in addition to the feature extraction processing described in Embodiment 1 or Embodiment 2, the appliance feature extraction unit 214 performs processing for deleting the last code and the second last code if the difference between the last code and the second last code is equal to or less than a predetermined value, in the case that the change of the codes obtained by the difference value conversion unit 112 has the N-shaped characteristic, that is, the second last code is larger than the third last code, the last code is smaller than the second last code, and the current code is larger than the last code, or in the case that the change of the codes obtained by the difference value conversion unit 112 has the inverted N-shaped characteristic, that is, the second last code is smaller than the third last code, the last code is larger than the second last code, and the current code is smaller than the last code. In the case that the change of the codes has the inverted N-shaped characteristic and the last code and the second last code are deleted, the difference between the last code and the second last code is assumed to be 2 or less, for example.

By virtue of this processing, the code string [0812-61] extracted from the code string [0768113-4-2-611111] at constant time intervals converted by the difference value conversion unit 112 is stored in the appliance feature code string. Hence, the N-shaped characteristic or the inverted N-shaped characteristic of the code string is absorbed, and the rightward rising or rightward lowering feature of the original flow rate characteristic can be extracted definitely.

As described above, in Embodiment 3, the feature of an appliance, in which the inclination of the flow rate characteristic is reflected, from a code string at constant time intervals converted by the difference value conversion unit 112 is extracted by the appliance feature extraction unit 214; hence, accurate appliance identification can be performed, and the code string can be compressed by the feature extraction, whereby the size of the memory can be made small.

Embodiment 4

Figure 9:
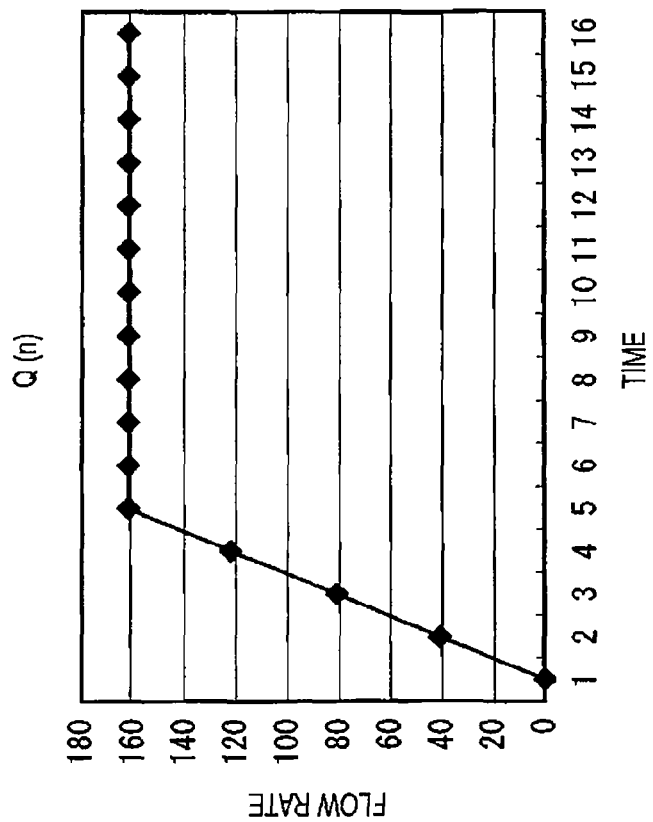
FIG. 9(a) is a view showing a concept in which the flow rate difference values at the time when a gas appliance E is used are classified according to the flow rate classification table in Embodiment 4 of the present invention.
FIG. 9(b) is a graph showing a flow rate characteristic at the time when the gas appliance E is used.
FIG. 9(c) is a graph showing classified codes at the time when the gas appliance E is used.
FIG. 9(d) is a graph showing a code string in which the feature at the time when the gas appliance E is used is extracted.
Figure 9:
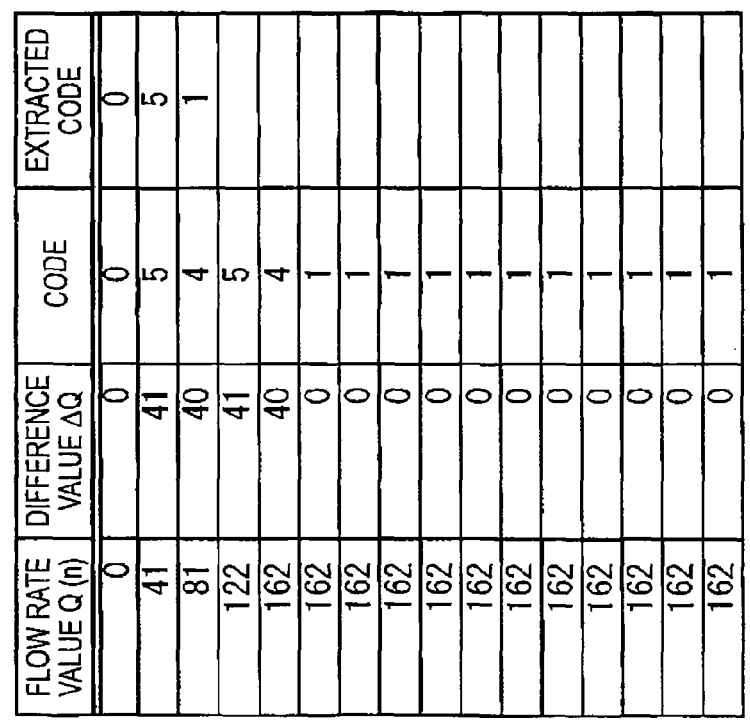

FIG. 9 is a view showing the concept of feature extraction in Embodiment 4 of the present invention. FIG. 9(a) is a view showing a concept in which the flow rate difference values at the time when a gas appliance E is used are classified according to the flow rate classification table in Embodiment 4. FIG. 9(b) is a graph showing a flow rate characteristic at the time when the gas appliance E is used. FIG. 9(c) is a graph showing classified codes at the time when the gas appliance E is used. FIG. 9(d) is a graph showing a code string in which the feature at the time when the gas appliance E is used is extracted. In the case of the gas appliance E having the flow rate rising characteristic shown in FIG. 9(b), the code string at constant time intervals converted by the difference value conversion unit 112 becomes [05454111111111111] as shown in FIG. 9(a). This is shown in the graph of FIG. 9(c). At this time, as shown in the example of FIG. 9(a), when the flow rate difference value changes in the vicinity of the threshold value as in the case that the flow rate difference value changes repeatedly between 41 L/h and 40 L/h, the difference between the 41 L/h and 40 L/h is only 1 L/h; however, the code changes like [5454], although the difference is small.

The code string in the flow rate rising zone is [05454] and has an M-shaped characteristic as shown in FIG. 9(c). In other words, although the flow rate characteristic is generally rightward rising, the code string has the M-shaped characteristic; hence, it cannot be said definitely that there is coincidence in the feature. Hence, in addition to the feature extraction processing described in Embodiment 1, Embodiment 2 or Embodiment 3, the appliance feature extraction unit 214 performs processing for deleting the last code and the second last code and for overwriting the current code on the second last code in the case that the difference between the last code and the second last code is equal to or less than a predetermined value and the second last code is equal to the current code when the change of the codes obtained by the difference value conversion unit 112 has the M-shaped characteristic, that is, the third last code is larger than the fourth last code, the second last code is smaller than the third last code, the last code is larger than the second last code, and the current code is smaller than the last code. In the case that the change of the codes has the M-shaped characteristic and the last code and the second last code are deleted, the difference between the last code and the second last code is assumed to be 1 or less.

By virtue of this processing, the rising code string [05454] of the codes converted by the difference value conversion unit 112 becomes [054], and [054111111111111] obtained by adding the subsequent codes is subjected to the processing described in Embodiment 1; as a result, the code string becomes [051] and stored in the appliance feature code string.

Figure 10:
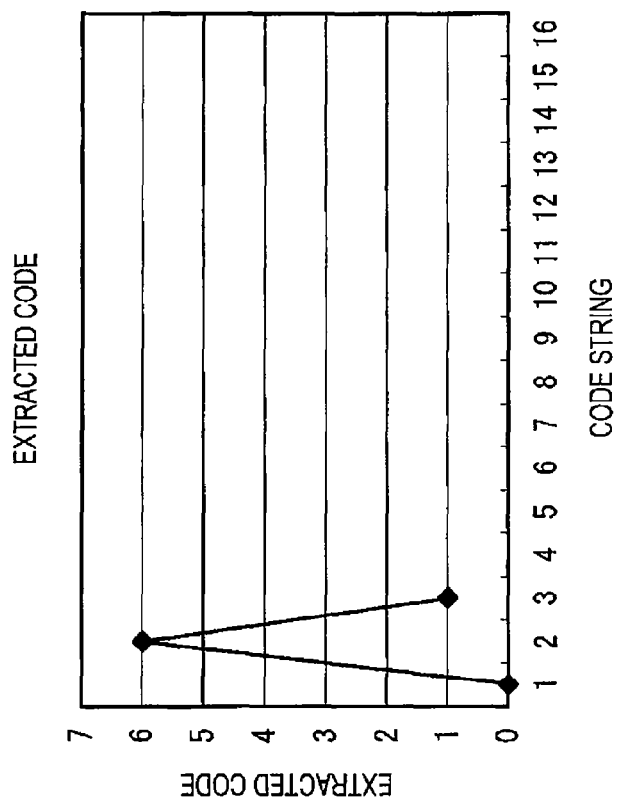
FIG. 10(a) is a view showing a concept in which the flow rate difference values at the time when a gas appliance F is used are classified according to the flow rate classification table in Embodiment 4 of the present invention.
FIG. 10(b) is a graph showing a flow rate characteristic at the time when the gas appliance F is used.
FIG. 10(c) is a graph showing classified codes at the time when the gas appliance F is used.
FIG. 10(d) is a graph showing a code string in which the feature at the time when the gas appliance F is used is extracted.
Figure 10:
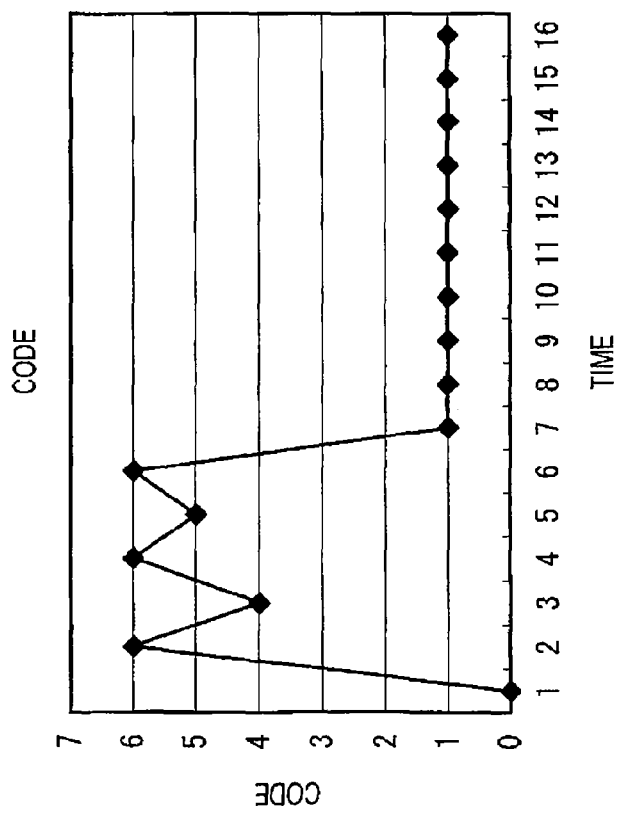

Next, FIG. 10 is also a view showing the concept of feature extraction in Embodiment 4 of the present invention, and the difference from FIG. 9 will be described below. FIG. 10(a) is a view showing a concept in which the flow rate difference values at the time when a gas appliance F is used are classified according to the flow rate classification table in Embodiment 4. FIG. 10(b) is a graph showing a flow rate characteristic at the time when the gas appliance F is used. FIG. 10(c) is a graph showing classified codes at the time when the gas appliance F is used. FIG. 10(d) is a graph showing a code string in which the feature at the time when the gas appliance F is used is extracted.

In the case of the gas appliance F having the flow rate rising characteristic shown in FIG. 10(b), the code string at constant time intervals converted by the difference value conversion unit 112 becomes [0646561111111111] as shown in FIG. 10(a). This is shown in the graph of FIG. 10(c). At this time, although the flow rate rising code string [06465] has the M-shaped characteristic as shown in the example shown in FIG. 9, the difference between the last code and the second last code is 2, thereby not satisfying the code compression condition for the M-shaped characteristic, whereby the codes remain without being compressed. However, a code string [64656] obtained by deleting the head code and by adding the next code has a W-shaped characteristic as shown in FIG. 10(c).

Hence, in addition to the feature extraction processing described in Embodiment 1, Embodiment 2 or Embodiment 3, the appliance feature extraction unit 214 performs processing for deleting the last code and the second last code stored in the appliance feature code string and for overwriting the current code on the second last code stored in the appliance feature code string in the case that the difference between the last code and the second last code is equal to or less than a predetermined value and the second last code is equal to the current code when the change of the codes obtained by the difference value conversion unit 112 has the W-shaped characteristic, that is, the third last code is smaller than the fourth last code, the second last code is larger than the third last code, the last code is smaller than the second last code, and the current code is larger than the last code. In the case that the change of the codes has the W-shaped characteristic and the last code and the second last code are deleted, the difference between the last code and the second last code is assumed to be 1 or less.

By virtue of this processing, the rising code string [64656] of the codes converted by the difference value conversion unit 112 becomes [646]. Furthermore, of [06461111111111] obtained by adding the head and subsequent codes corresponds to the inverted N-shaped characteristic described in Embodiment 3; hence, this code string is subjected to the processing described in Embodiment 1, whereby the code string becomes [061] and stored in the appliance feature code string.

By virtue of the M-shaped and W-shaped characteristic processing, the M-shaped characteristic or the W-shaped characteristic of the code string is absorbed, and the feature of the original flow rate characteristic can be extracted definitely.

As described above, in Embodiment 4, the feature of an appliance, in which the inclination of the flow rate characteristic is reflected, from a code string at constant time intervals converted by the difference value conversion unit 112 is extracted by the appliance feature extraction unit 214; hence, accurate appliance identification can be performed, and the code string can be compressed by the feature extraction, whereby the size of the memory can be made small.

Embodiment 5

Figure 11:
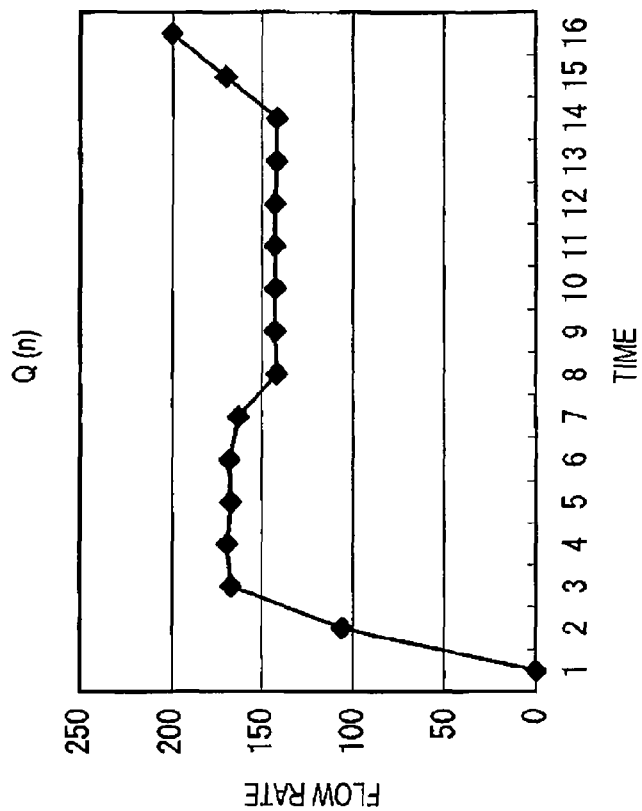
FIG. 11(a) is a view showing a concept in which the flow rate difference values at the time when the gas appliance C is used are classified according to the flow rate classification table in Embodiment 5 of the present invention.
FIG. 11(b) is a graph showing a flow rate characteristic at the time when the gas appliance C is used.
FIG. 11(c) is a graph showing classified codes at the time when the gas appliance C is used.
FIG. 11(d) is a graph showing a code string in which the feature at the time when the gas appliance C is used is extracted.
Figure 11:
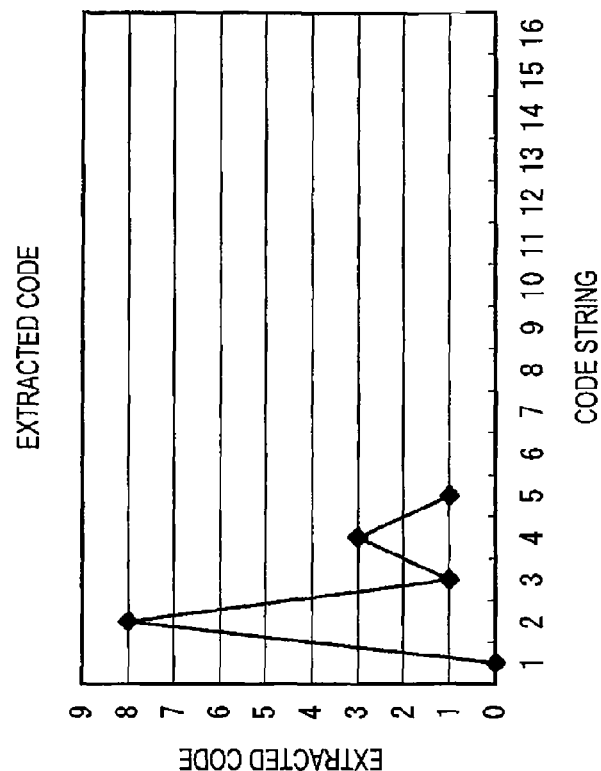
Figure 11:
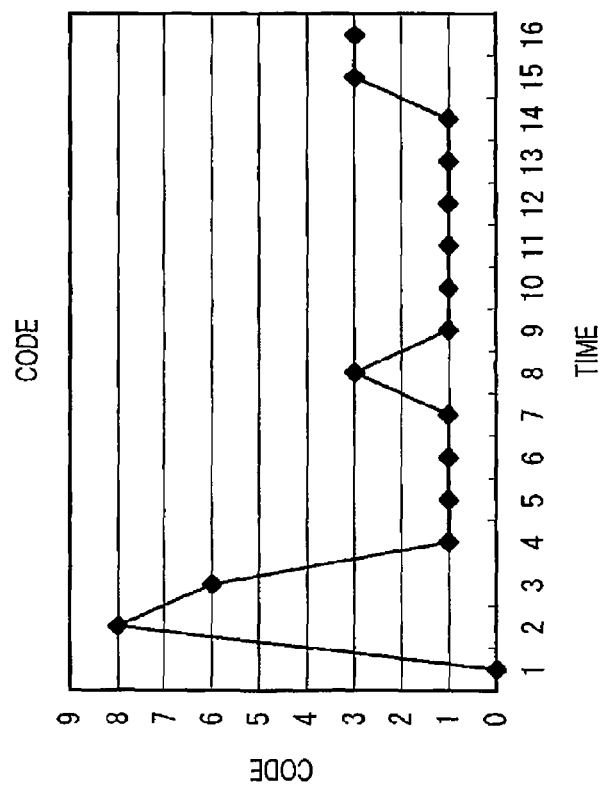
Figure 12:
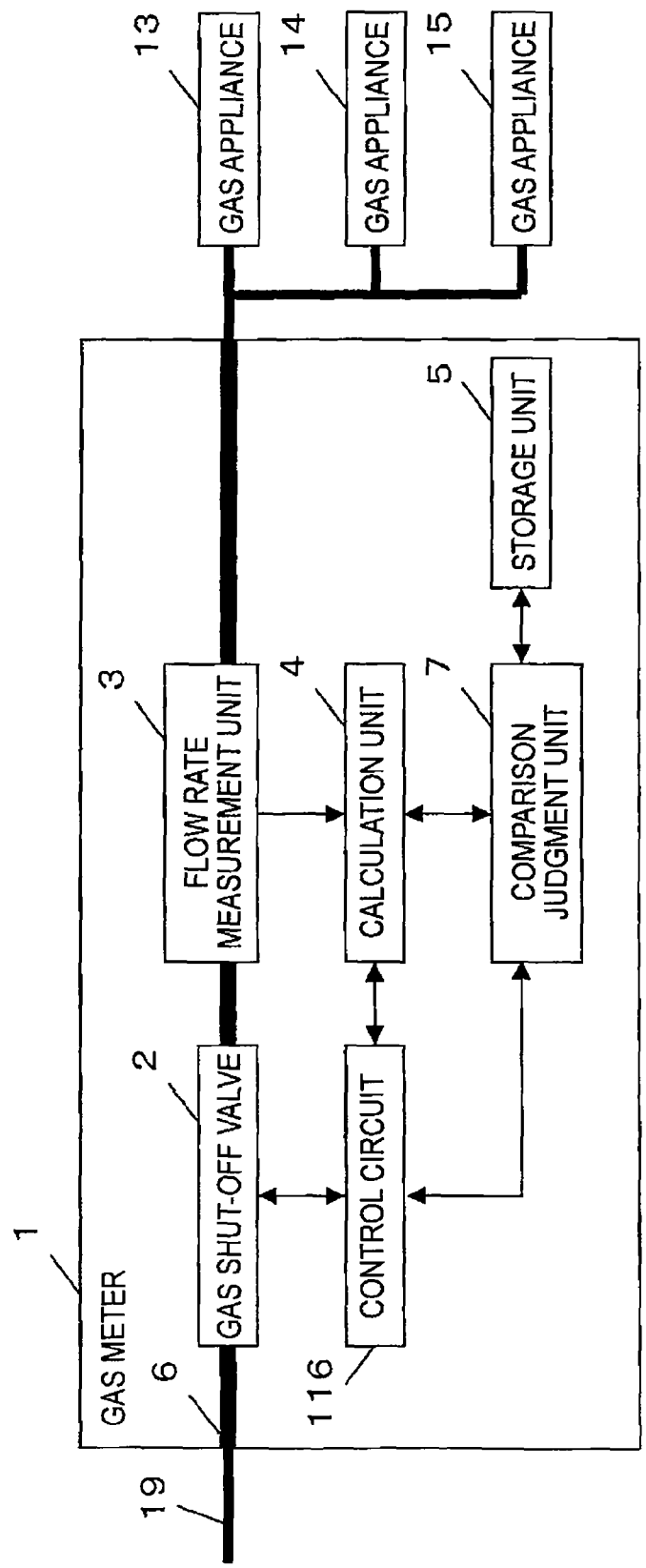
FIG. 12 is a block diagram showing the conventional gas meter.
Figure 13:
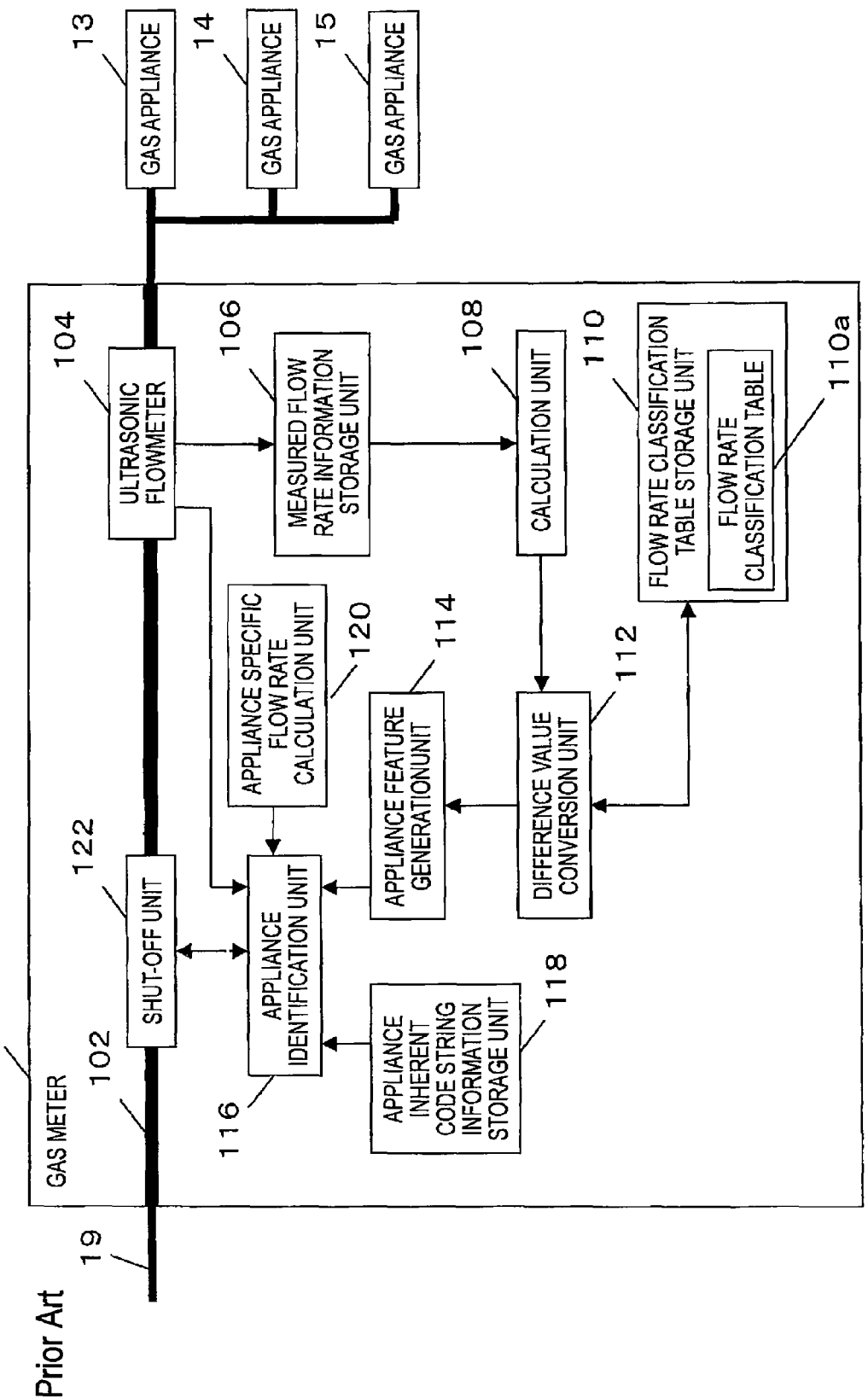
FIG. 13 is a block diagram showing the conventional flow rate measuring device.

FIG. 11 is a view showing the concept of feature extraction in Embodiment 5 of the present invention. FIG. 11(a) is a view showing a concept in which the flow rate difference values at the time when the gas appliance C is used are classified according to the flow rate classification table in Embodiment 5. FIG. 11(b) is a graph showing a flow rate characteristic at the time when the gas appliance C is used. FIG. 11(c) is a graph showing classified codes at the time when the gas appliance C is used. FIG. 11(d) is a graph showing a code string in which the feature at the time when the gas appliance C is used is extracted. Although a case in which the gas appliance C explained in Embodiment 1 is ignited and then its heating power is switched is described, it is assumed that the change of the rising flow rate until the heating power is changed is the same as that shown in FIG. 6. FIG. 11(b) shows the flow rate rising characteristic including the change of the heating power after the ignition, and the code string at constant time intervals converted by the difference value conversion unit 112 becomes [0861113111111133] as shown in FIG. 11(a). This is shown in the graph of FIG. 11(c).

As described in Embodiment 1, when the code string [086111131111111] until the heating power is changed is subjected to the feature extraction processing, the code string becomes [08131]; however, if heating power change codes are included, the code string becomes [0813133] and finally becomes [081313] when further subjected to the processing of Embodiment 1. Hence, since the code string is different from the extracted code string [08131] shown in FIG. 6 of Embodiment 1, the gas appliances cannot be identified as the same gas appliance.

Therefore, the appliance feature extraction unit 214 performs processing for deleting the final code from the appliance feature code string in the case that the absolute value of the final code in the appliance feature code string is equal to or more than a predetermined value. It is herein assumed that the predetermined value according to which the final code is deleted is 2 or more.

By virtue of this processing, the above-mentioned code string [081313] becomes [08131]; hence, the same code string as that in the case in which the heating power is not changed, shown in FIG. 6, is obtained, whereby the gas appliances can be identified as the same gas appliance.

As described above, in Embodiment 5, the code that appears when the artificial switching of the amount of combustion is performed can be deleted from the appliance feature code string in Embodiment 5, and accurate appliance identification can be performed; furthermore, the code string can be compressed by the feature extraction, whereby the size of the memory can be made small.

To execute the above-mentioned flow rate measurement method, a program for executing the respective steps of the flow rate measurement method is stored in the appliance identification unit 116 or a computer (arithmetic unit), not shown, of the gas meter 100; however, hardware, instead of the program, can also be used for the execution.

In the respective embodiments described above, the case in which the ultrasonic flowmeter is used as flow rate measurement unit has been described; however, it is obvious that a similar effect is also obtained even in the case that another type of instantaneous flow rate measuring device that uses a sampling signal is used. Although the explanation of the processing that is performed after the appliance identification is omitted, it is obvious in the gas meter that an appliance specific charge based on the measurement of the integrated flow rate for each registered appliance or each classified group can be set, and that an appliance specific security function for safety control (security function) for each registered appliance or each classified group can be set. Moreover, if a transmitting and receiving unit, such as a wireless device, can be mounted on a gas meter and a gas appliance, it is obvious that the accuracy of appliance identification is improved.

In the respective embodiments described above, the appliance feature extraction using codes obtained by converting flow rate difference values at constant time intervals has been described; however, more accurate feature extraction can be performed using the flow rate difference values.

In the respective embodiments described above, appliance identification is performed by comparing the appliance inherent feature code string stored in the appliance inherent code string information storage unit 218 with the appliance feature code string indicating the feature of an appliance on the basis of codes obtained at constant time intervals by the difference value conversion unit; however, the appliance inherent feature code string may be corrected in consideration of variations obtained when an actual flow rate measurement is repeated. Furthermore, it may be possible, for example, that an appliance registration mode is provided, an appliance is operated repeatedly on site, the feature of the appliance is extracted and averaged, for example, and the feature is registered as an appliance inherent feature code string. Moreover, without presetting the appliance inherent feature code string, the appliance inherent feature code string may be registered automatically by learning.

The respective embodiments of the present invention have been described above; however, the present invention is not limited to the matters described in the above-mentioned embodiments, but the modifications and applications thereof implemented by those skilled in the art on the basis of the descriptions of the specification and known technologies are supposed to be planned in the present invention and included in the scope of protection.

The present application is based on Japanese Patent Application (Application No. 2009-048791) filed on Mar. 3, 2009 and Japanese Patent Application (Application No. 2009-212592) filed on Sep. 15, 2009, and the contents thereof are herein incorporated by reference.

INDUSTRIAL APPLICABILITY

Since the flow rate measuring device according to the present invention can extract the features of appliances as described above, the instrument is applicable for the identification and the grouping of the appliances used and connected on the downstream side of the flow rate measuring device, as in the case of an industrial flowmeter and a water meter.

The invention claimed is:

1. A flow rate measuring device comprising:
a computer processor;
a flow rate measurement device to measure the flow rate of fluid flowing through a flow passage at constant time intervals;
a calculation unit executable by the computer processor to calculate difference values of the flow rate measured by the flow rate measurement device at the constant time intervals;
a flow rate classification table in which classifications of a plurality of difference values, depending on magnitudes of the difference values, are associated with codes representing the classifications;
a difference value conversion unit executable by the computer processor to convert the difference values calculated by the calculation unit into codes on the basis of the flow rate classification table;
an appliance feature extraction unit executable by the computer processor to generate an appliance feature code string indicating the feature of an appliance from the codes obtained at constant time intervals by the difference value conversion unit; and
an appliance identification unit executable by the computer processor to perform appliance identification by comparison of the appliance feature code string with a predetermined appliance inherent feature code string indicating the feature code string inherent in each appliance,
wherein in response to a last code of the codes obtained by execution of the difference value conversion unit being larger than a second to last code and the last code being larger than a current code, or in the case that the last code is smaller than the second to last code and the last code is smaller than the current code, the appliance feature extraction unit executable by the computer processor to store the current code in the appliance feature code string; and in all other cases, the extraction unit executable by the computer processor to overwrite the current code onto the last code stored in the appliance feature code string.

2. The flow rate measuring device according to claim 1, wherein the appliance feature extraction unit is executable to add a minus sign to codes in the case that the difference values calculated by the calculation unit are minus and the codes obtained by the difference value conversion unit are other than a predetermined code and does not overwrite the current code on the last code stored in the appliance feature code string in the case that the last code is plus and the current code is minus.

3. The flow rate measuring device according to claim 1, wherein the appliance feature extraction unit is executable to delete the last code and the second last code stored in the appliance feature code string and overwrite the current code on the second last code stored in the appliance feature code string in the case that the difference between the last code and the second last code is equal to or less than a predetermined value and the second last code is smaller than the current code when the change of the codes obtained by the difference value conversion unit has an N-shaped characteristic, that is, the second last code is larger than the third last code, the last code is smaller than the second last code, and the current code is larger than the last code, or in the case that the difference between the last code and the second last code is equal to or less than the predetermined value and the second last code is larger than the current code when the change of the codes obtained by the difference value conversion unit has an inverted N-shaped characteristic, that is, the second last code is smaller than the third last code, the last code is larger than the second last code, and the current code is smaller than the last code.

4. The flow rate measuring device according to claim 1, wherein the appliance feature extraction unit is executable to delete the last code and the second last code stored in the appliance feature code string and overwrite the current code on the second last code stored in the appliance feature code string in the case that the difference between the last code and the second last code is equal to or less than a predetermined value and the second last code is equal to the current code when the change of the codes obtained by the difference value conversion unit has an M-shaped characteristic, that is, the third last code is larger than the fourth last code, the second last code is smaller than the third last code, the last code is larger than the second last code, and the current code is smaller than the last code, or in the case that the difference between the last code and the second last code is equal to or less than the predetermined value and the second last code is equal to the current code when the change of the codes obtained by the difference value conversion unit has a W-shaped characteristic, that is, the third last code is smaller than the fourth last code, the second last code is larger than the third last code, the last code is smaller than the second last code, and the current code is larger than the last code.

5. The flow rate measuring device according to claim 1, wherein the appliance feature extraction unit is executable to delete the final code from the appliance feature code string in the case that the absolute value of the final code in the appliance feature code string is equal to or more than a predetermined value.

6. A method of flow rate measurement comprising:
measuring at constant time intervals a flow rate of fluid flowing through a flow passage with a flow rate measurement device included in a flow rate measuring device;
calculating difference values between the flow rates measured by the flow rate measurement device with a calculation unit included in the flow rate measuring device;
converting the difference values calculated by the calculation unit into codes in a measured code string with a difference value conversion unit included in the flow rate measuring device, the conversion performed using a flow rate classification table, the flow rate classification table comprising respective classifications of a plurality of magnitudes of the difference values;
selectively extracting codes from the measured code string with an appliance feature extraction unit included in the flow rate measuring device, the codes selectively extracted to form an extracted code string by comparing a first code in the measured code string to a second code in the measured code string and including the first code in the extracted code string in response to the comparison meeting a predetermined criteria so that the extracted code string includes fewer codes than the measured code string; and
identifying an appliance from the extracted code string with an appliance identification unit included in the flow rate measuring device.

7. The method of claim 6, wherein selectively extracting codes from the measured code string further comprises adding a current code in the extracted code string when the predetermined criteria is met, and overwriting a code stored in the extracted code string with the current code when the predetermined criteria is not met.

8. The method of claim 7, wherein the predetermined criteria comprises a last code of the codes obtained by the difference value conversion unit being larger than a second last code, and the last code being larger than the current code; or the last code being smaller than the second last code, and the last code being smaller than the current code.

9. The method of claim 6, wherein the step of identifying an appliance from the extracted code string with an appliance identification unit further comprises comparing the extracted code string with a stored predetermined appliance inherent feature code string to identify the appliance associated with the stored appliance inherent feature code string.

10. The method of claim 6, wherein the step of selectively extracting codes from the measured code string with an appliance feature extraction unit to form an extracted code string further comprises adding a minus sign to a code in the extracted code string in response to a respective difference value being a negative value.

11. The method of claim 6, wherein the step of selectively extracting codes from the measured code string with an appliance feature extraction unit to form an extracted code string further comprises graphing the measured code string using the codes included in the measured code string as points in a graph, identifying a predetermined shape characteristic formed by a set of points in the graph; and adding fewer than all of the points from the set of points to the extracted code string.

12. The method of claim 11, wherein the predetermined shape characteristic is substantially one of an "N" shaped characteristic, an inverted "N" shaped characteristic, an "M" shaped characteristic, or an inverted "M" shaped characteristic.

13. A flow rate measuring device comprising:
a flow rate measurement device operable to measure at constant time intervals a flow rate of fluid flowing through a flow passage;
the flow rate measuring device operable to derive difference values of the flow rate measured by the flow rate measurement device, the difference values derived by calculation of difference values as a difference in flow rate between sequentially measured absolute flow rates;
a flow rate classification table, the flow rate measuring device operable to convert the difference values into codes in a measured code string based on information in the flow rate classification table, the flow rate classification table comprising respective classifications of a plurality of magnitudes of the difference values;
the flow rate measuring device operable to selectively extract codes from the measured code string to form an extracted code string, the codes selectively extracted by comparison of a first code in the measured code string to a second code in the measured code string and inclusion of the first code in the extracted code string only in response to the comparison meeting a predetermined criteria, the extracted code string comprising fewer codes than the measured code string; and
the flow rate measuring device operable to identify an appliance from the extracted code string.

14. The flow rate measuring device of claim 13, wherein the flow rate measuring device is further operable to add a current code to the extracted code string when the predetermined criteria is met, and overwrite a code stored in the extracted code string with the current code when the predetermined criteria is not met.

15. The flow rate measuring device of claim 14, wherein the predetermined criteria comprises a last code of the codes obtained by the difference value conversion unit being larger than a second last code and the last code being larger than the current code or the last code being smaller than the second last code and the last code being smaller than the current code.

16. The flow rate measuring device of claim 13, wherein the flow rate measuring device is operable to compare the extracted code string with a stored appliance inherent feature code string to identify the appliance associated with the stored appliance inherent feature code string.

17. The flow rate measuring device of claim 13, wherein the the flow rate measuring device is operable to add a minus sign to a code in the extracted code string in response to a respective difference value being a negative value.

18. The flow rate measuring device of claim 13, wherein the flow rate measuring device is operable to use the codes in the measured code string as points in a graph, identify a predetermined shape characteristic formed by a set of points in the graph, and add fewer than all of the points from the set of points to the extracted code string.

19. The flow rate measuring device of claim 18, wherein the predetermined shape characteristic is substantially one of an "N" shaped characteristic, an inverted "N" shaped characteristic, an "M" shaped characteristic, or an inverted "M" shaped characteristic.

* * * * *